(12) United States Patent
Baumgartner et al.

(10) Patent No.: US 8,959,724 B2
(45) Date of Patent: *Feb. 24, 2015

(54) AIRBAG ARRANGEMENT AND TOOLS

(75) Inventors: Peter Baumgartner, Gunzburg (DE); Ralf Gutmann, Ulm (DE); Oliver Glöckler, Nersingen (DE)

(73) Assignee: Takata AG, Aschaffenburg (DE)

( * ) Notice: Subject to any disclaimer, the term of this patent is extended or adjusted under 35 U.S.C. 154(b) by 925 days.

This patent is subject to a terminal disclaimer.

(21) Appl. No.: 12/232,575

(22) Filed: Sep. 19, 2008

(65) Prior Publication Data

US 2009/0020986 A1 Jan. 22, 2009

Related U.S. Application Data

(63) Continuation of application No. 11/611,676, filed on Dec. 15, 2006, now Pat. No. 7,861,384, which is a continuation-in-part of application No. PCT/DE2005/001508, filed on Aug. 25, 2005.

(30) Foreign Application Priority Data

| Sep. 6, 2004 | (DE) | 20 2004 014 219 U |
| Dec. 16, 2005 | (DE) | 20 2005 019 867 U |
| Jan. 17, 2006 | (DE) | 20 2006 000 846 U |

(51) Int. Cl.
  *F16B 1/00* (2006.01)
  *B60R 21/20* (2011.01)
  (Continued)

(52) U.S. Cl.
  CPC .......... *B60R 21/20* (2013.01); *F16B 21/08* (2013.01); *B60R 21/213* (2013.01); *B60R 21/217* (2013.01)
  USPC ........... 24/293; 24/453; 52/718.06; 52/716.7; 52/718.03; 280/728.2; 411/508

(58) Field of Classification Search
  USPC ............ 24/295, 293, 297, 453; 411/508–510; 403/408.1; 52/716.7, 718.06, 716.5, 52/716.6, 716.8, 718.03, 704; 280/728.2
  See application file for complete search history.

(56) References Cited

U.S. PATENT DOCUMENTS

| 3,024,509 A | 3/1962 | Hamann |
| 3,864,789 A | 2/1975 | Leitner |

(Continued)

FOREIGN PATENT DOCUMENTS

| CN | 100587278 C | 2/2010 |
| DE | 31 12 160 A1 | 10/1982 |

(Continued)

OTHER PUBLICATIONS

Mecano Speed-Nuts, Mecano-Simmonds GmbH, pp. 25, 25-1, and 25-2.

(Continued)

*Primary Examiner* — Jack W Lavinder
(74) *Attorney, Agent, or Firm* — Foley & Lardner LLP

(57) ABSTRACT

A fixing element fixes a part to a support wall. When the fixing element is inserted into an opening in the support wall and reaches a predetermined end position, the fixing element locks to the support wall. The fixing element includes a stop element, a snap-on element, and an unlocking element. The stop element bears against a side of the support wall when the fixing element is locked to the support wall. The snap-on element is positioned on an inner side of the support wall when the fixing element is locked to the support wall. The unlocking element is connected to the snap-on element. The unlocking element is configured to permit the snap-on element to be unlocked and the fixing element to be removed from the opening. An installation tool and a testing tool may be used in conjunction with the fixing element.

22 Claims, 26 Drawing Sheets

(51) Int. Cl.
*F16B 21/08* (2006.01)
*B60R 21/213* (2011.01)
*B60R 21/217* (2011.01)

(56) References Cited

U.S. PATENT DOCUMENTS

| | | | |
|---|---|---|---|
| 4,606,688 A * | 8/1986 | Moran et al. | 411/175 |
| 4,728,068 A | 3/1988 | Rivkin | |
| 5,099,549 A | 3/1992 | Hullmann et al. | |
| 5,403,034 A | 4/1995 | Gans et al. | |
| 5,539,962 A | 7/1996 | Lee | |
| 5,636,891 A | 6/1997 | Van Order et al. | |
| 6,438,804 B1 | 8/2002 | Romero Magarino | |
| 6,517,300 B2 * | 2/2003 | Bentrim et al. | 411/45 |
| 6,588,071 B2 | 7/2003 | Gramss | |
| 6,644,713 B2 * | 11/2003 | Del Pozo Abejon et al. | 296/39.1 |
| 6,705,635 B2 | 3/2004 | Hoeft et al. | |
| 7,040,647 B2 | 5/2006 | Deligny et al. | |
| 7,374,200 B2 | 5/2008 | Ikeda et al. | |
| 7,415,751 B2 * | 8/2008 | Kato et al. | 24/289 |
| 7,637,527 B2 * | 12/2009 | Mazanek et al. | 280/728.2 |
| 7,669,883 B2 | 3/2010 | Giddings et al. | |
| 7,887,086 B2 | 2/2011 | Kalandek | |
| 2004/0109083 A1 | 6/2004 | Fuchimukai | |
| 2004/0124650 A1 * | 7/2004 | Del Pozo Abejon | 296/1.07 |
| 2005/0206135 A1 | 9/2005 | Nelson et al. | |
| 2005/0225061 A1 | 10/2005 | Hofmann et al. | |
| 2006/0138756 A1 | 6/2006 | Ochiai et al. | |
| 2006/0192368 A1 | 8/2006 | Hall et al. | |
| 2006/0197317 A1 | 9/2006 | Watanabe | |
| 2007/0216139 A1 | 9/2007 | Mazanek et al. | |
| 2011/0079989 A1 | 4/2011 | Baumgartner | |

FOREIGN PATENT DOCUMENTS

| | | |
|---|---|---|
| DE | 32 12 160 A1 | 10/1983 |
| DE | 40 08 829 A1 | 9/1991 |
| DE | 196 50 925 A1 | 6/1997 |
| DE | 196 07 786 A1 | 9/1997 |
| DE | 199 56 927 C1 | 1/2001 |
| DE | 202 09 137 U1 | 12/2002 |
| DE | 101 47 091 A1 | 4/2003 |
| DE | 103 57 488 A1 | 7/2004 |
| DE | 20 2004 014 219 U1 | 12/2004 |
| DE | 10 2004 017 188 A1 | 11/2005 |
| DE | 10 2006 011 836 B3 | 10/2007 |
| EP | 0 889 247 A2 | 1/1999 |
| EP | 0 908 633 A1 | 4/1999 |
| EP | 1 186 787 A1 | 3/2002 |
| EP | 1 584 521 A2 | 10/2005 |
| GB | 848100 | 9/1960 |
| JP | 09-032979 | 2/1997 |
| JP | 2000-344042 A | 12/2000 |
| JP | 2001-277986 A | 10/2001 |
| JP | 2003-247517 A | 9/2003 |
| JP | 2004-224209 A | 8/2004 |
| WO | WO 02/28690 A1 | 4/2002 |
| WO | WO 2004108473 A1 * | 12/2004 |
| WO | WO 2006026956 A1 * | 3/2006 |

OTHER PUBLICATIONS

Japanese Office Action mailing date of Jan. 5, 2011 with partial English translation (3 pgs).
Chinese Examination Report and English translation; CN No. 200910254166.5; Jul. 26, 2011; 6 pages.
US Office Action; U.S. Appl. No. 12/952,012, Aug. 9, 2011; 7 pages.
Notice of Allowance dated Mar. 2, 2012 issued in connection with U.S. Appl. No. 12/952,012.

* cited by examiner

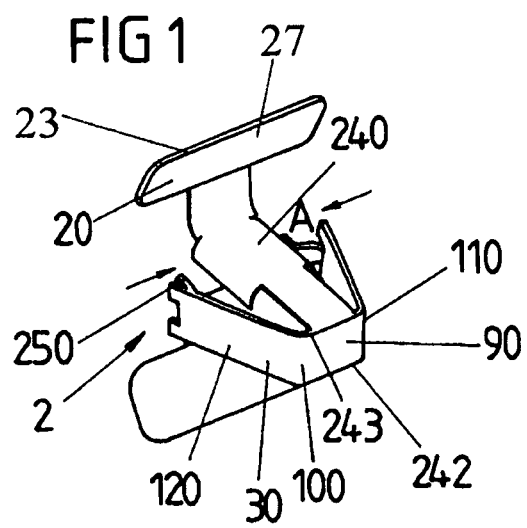
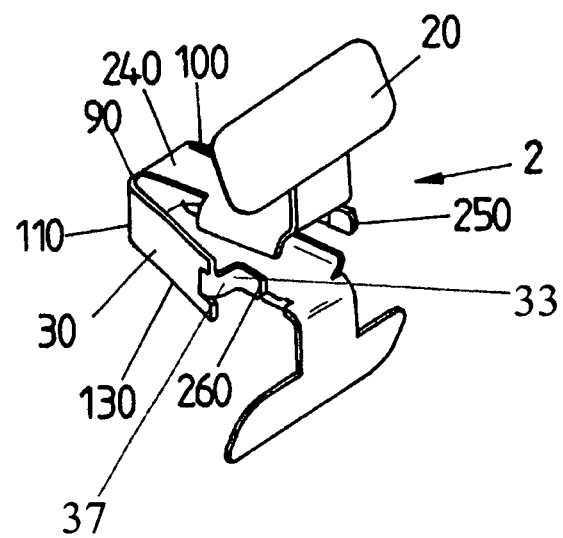

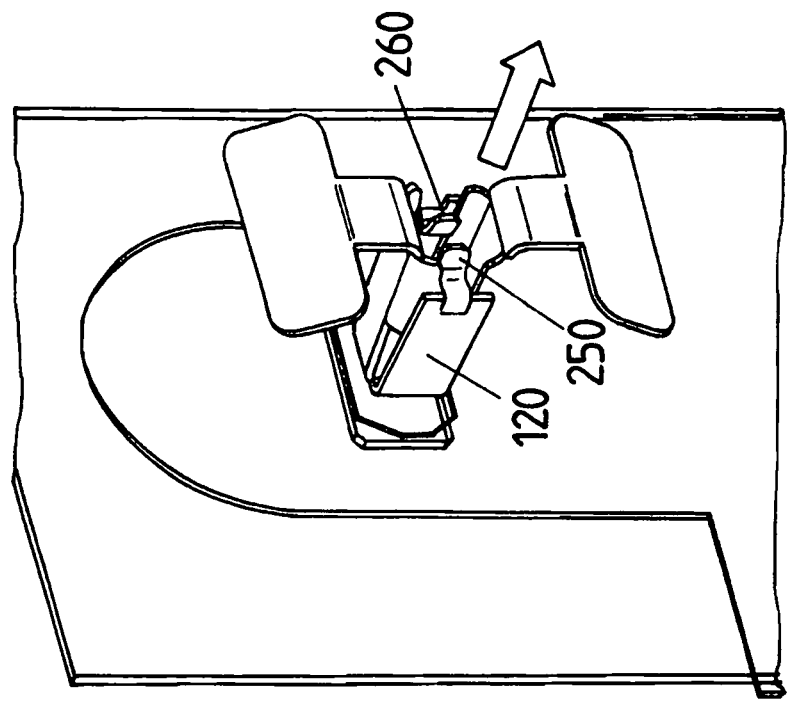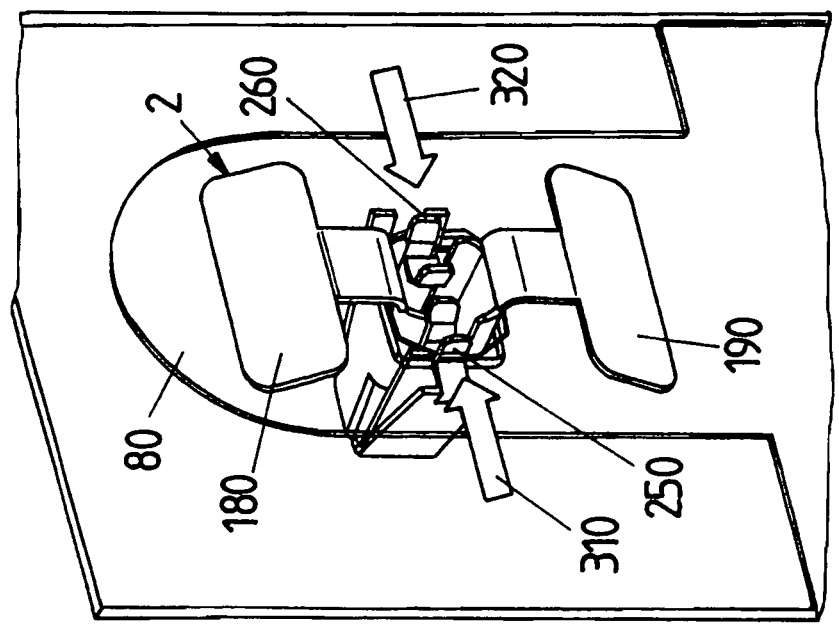

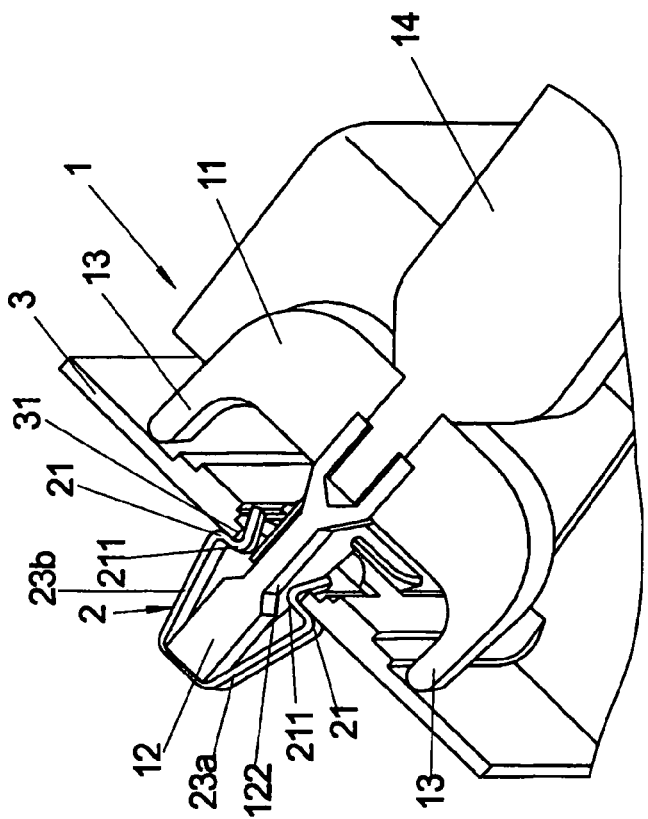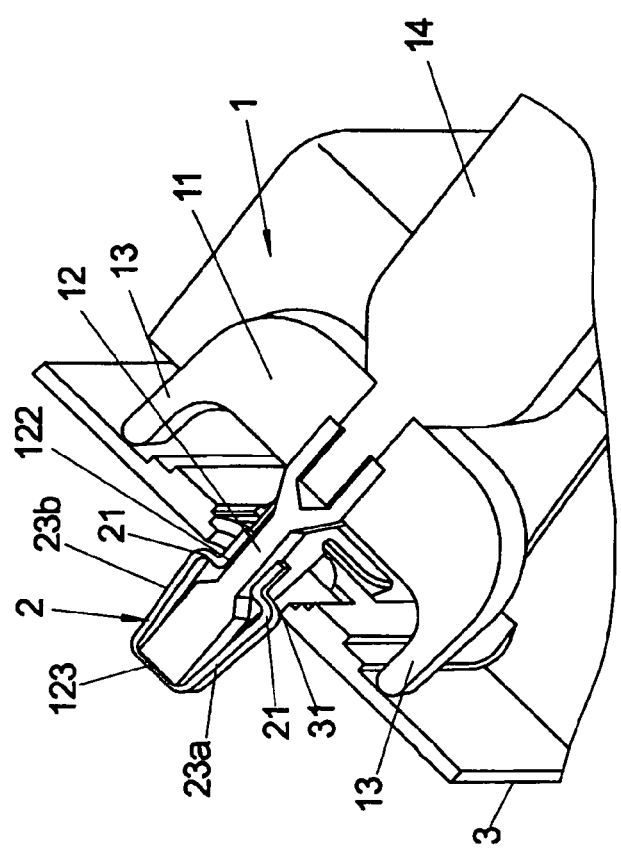

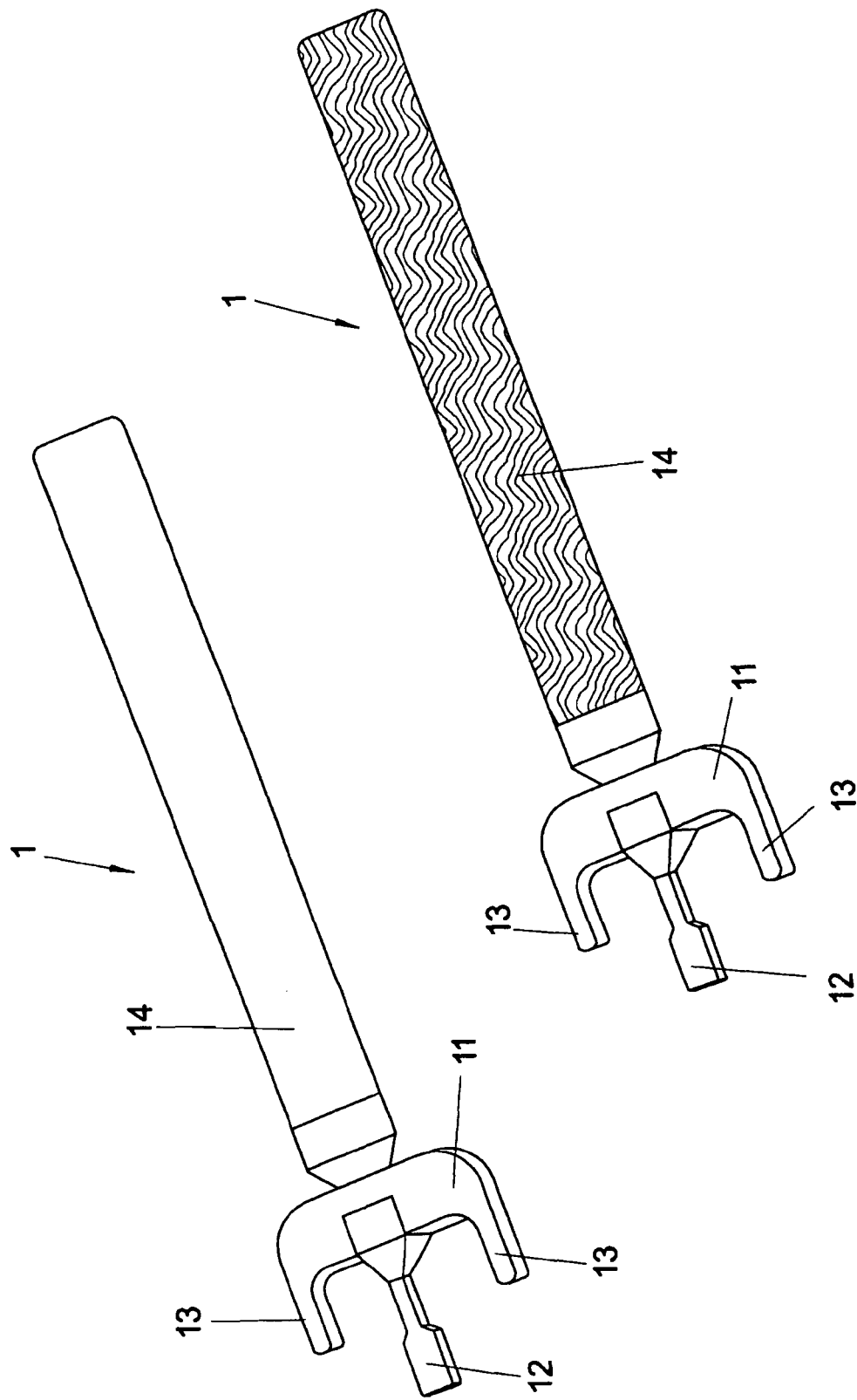

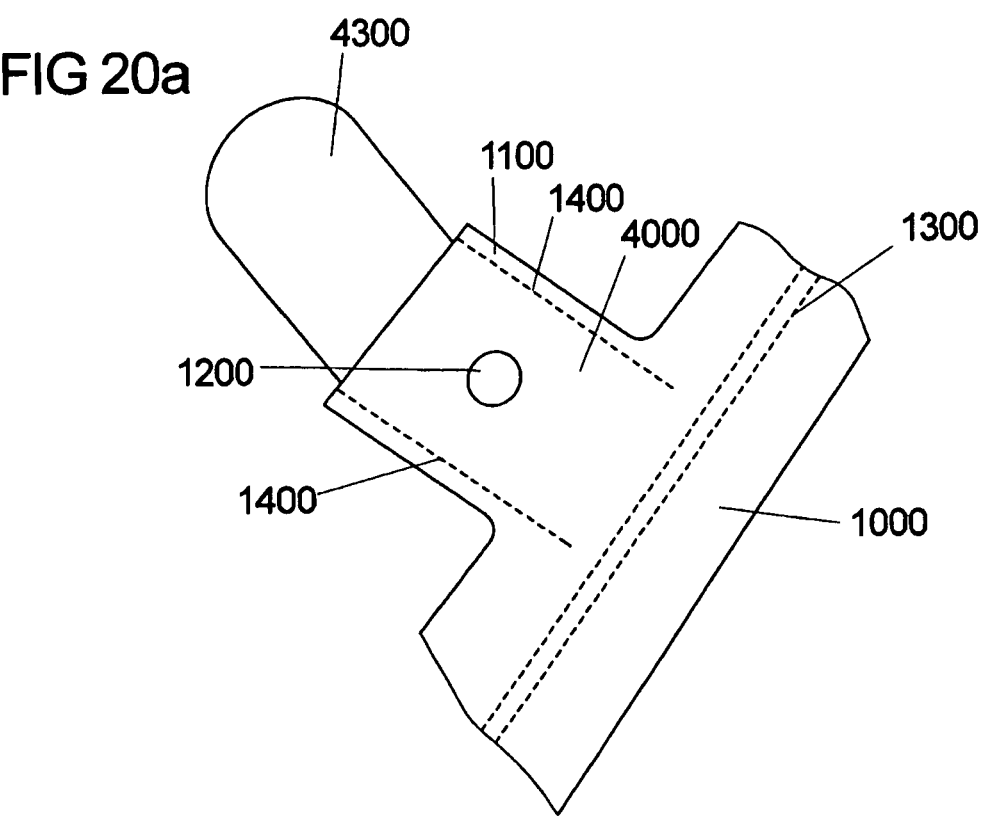
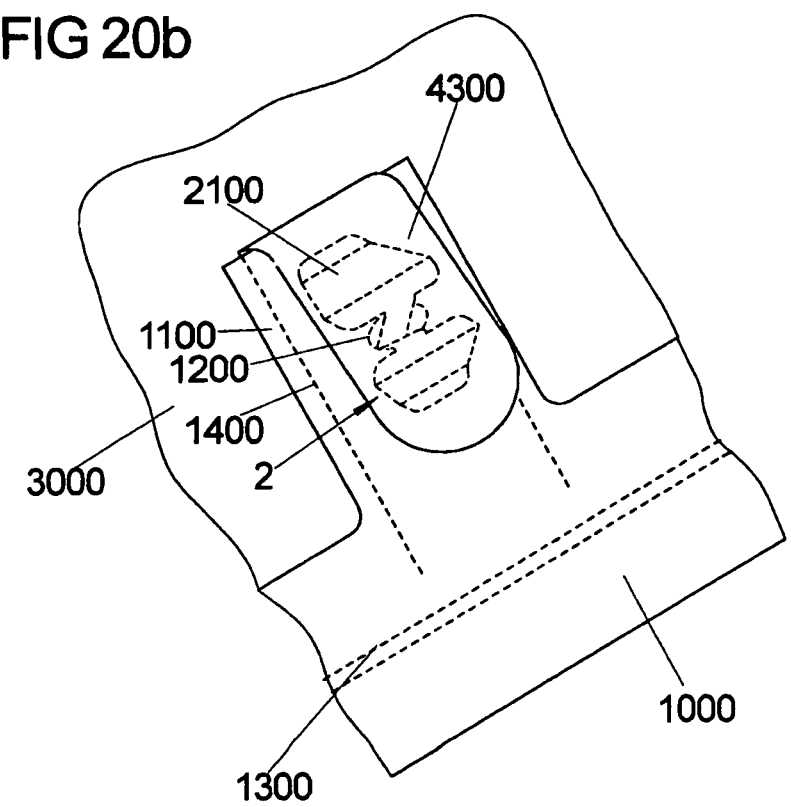

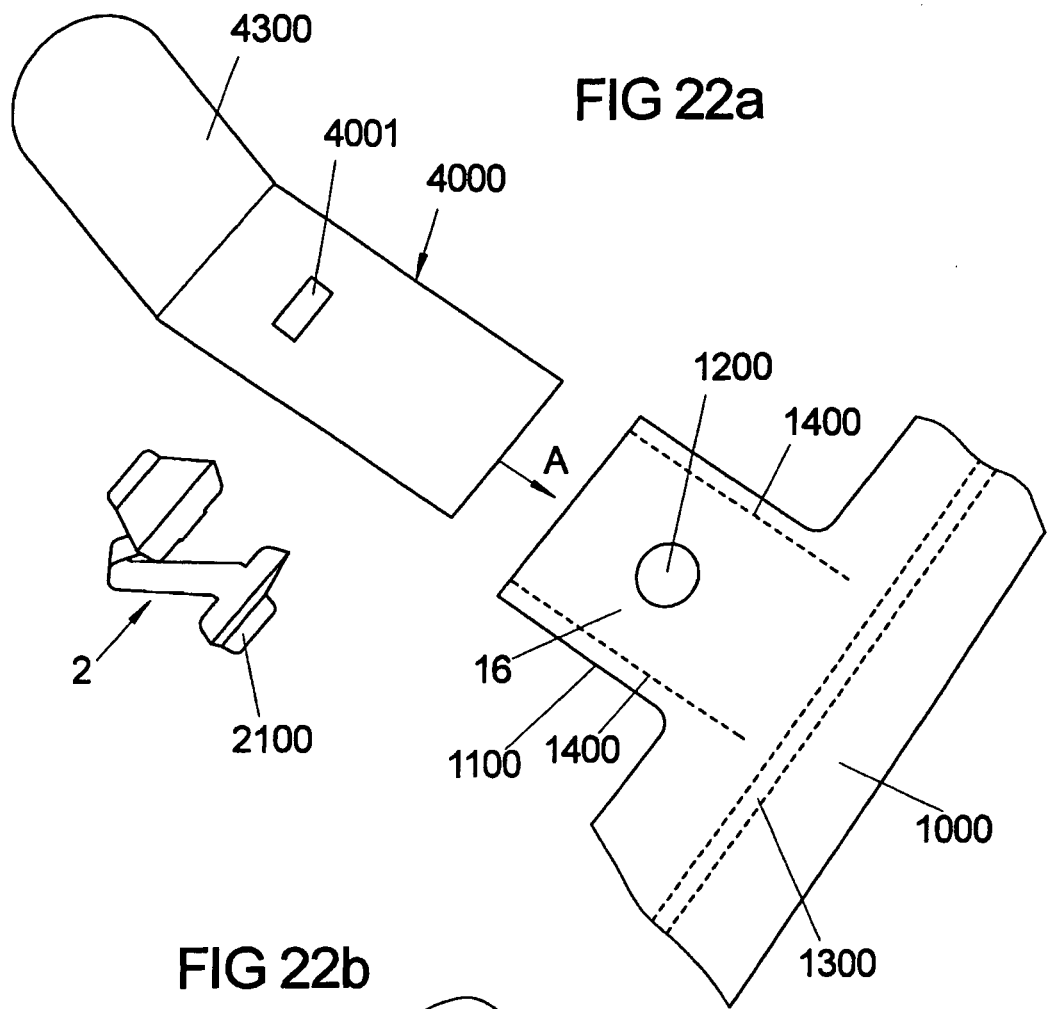
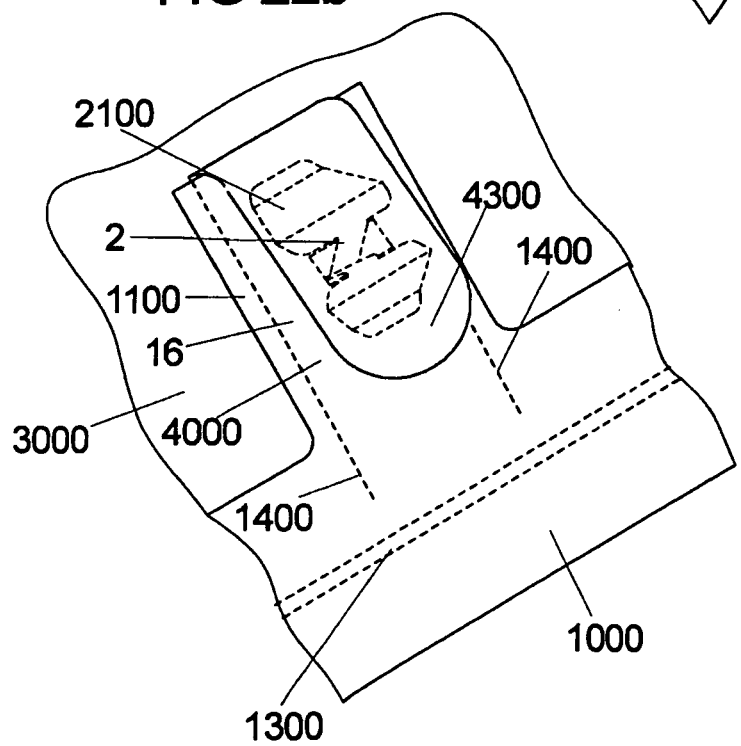

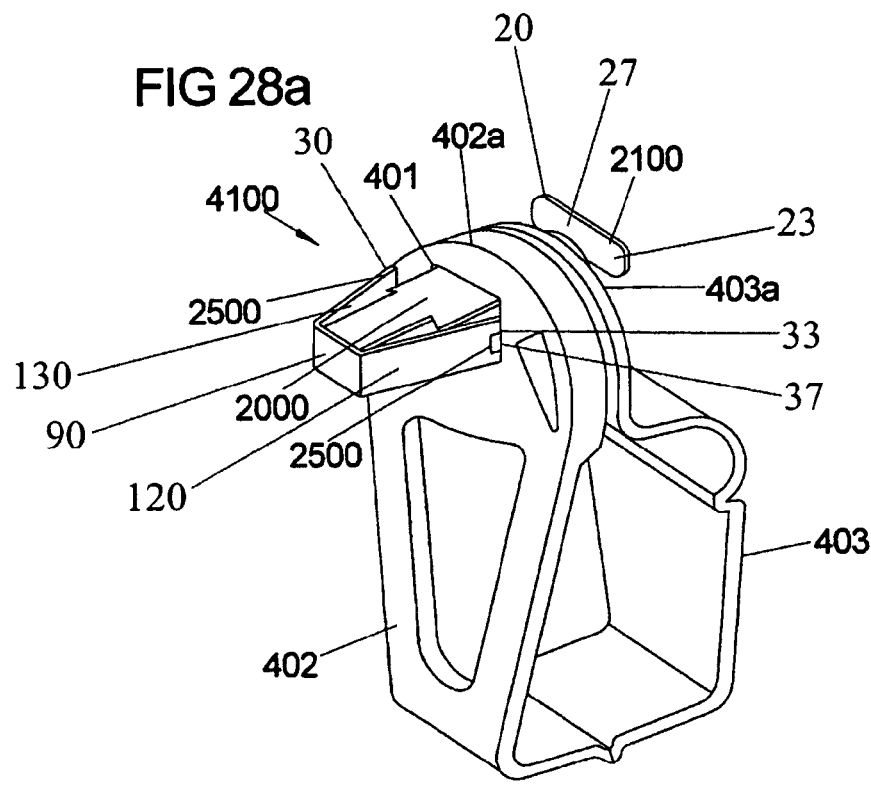
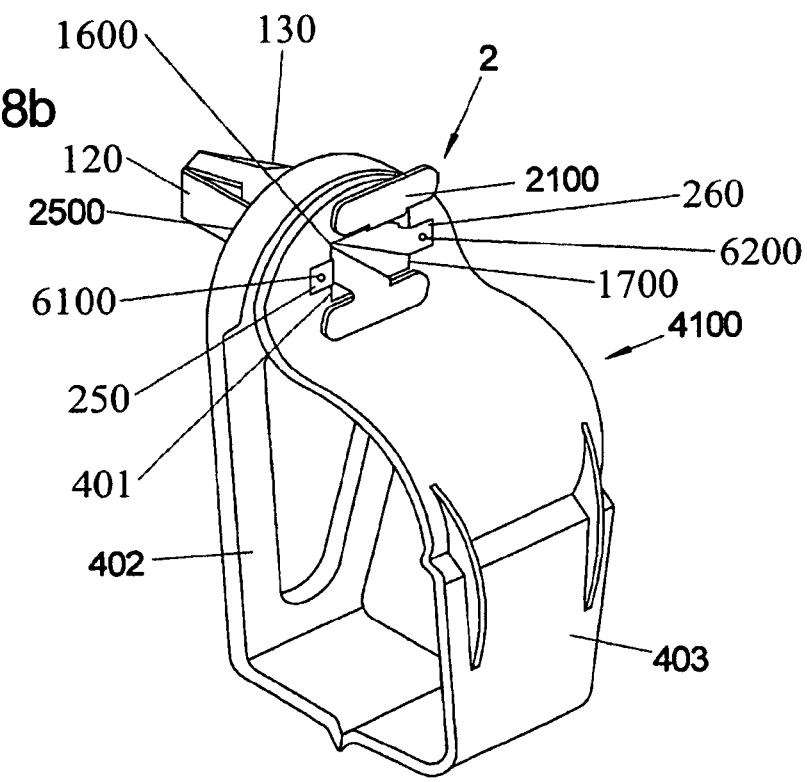

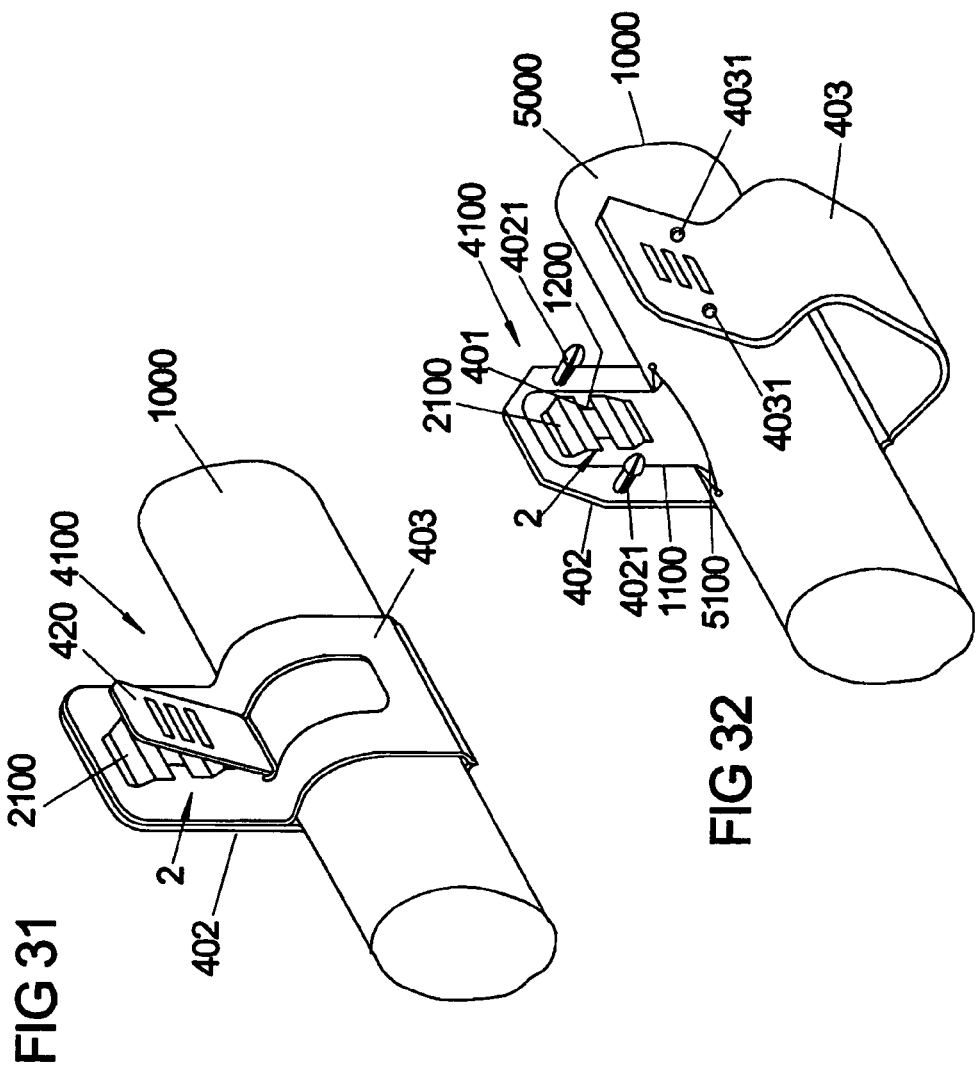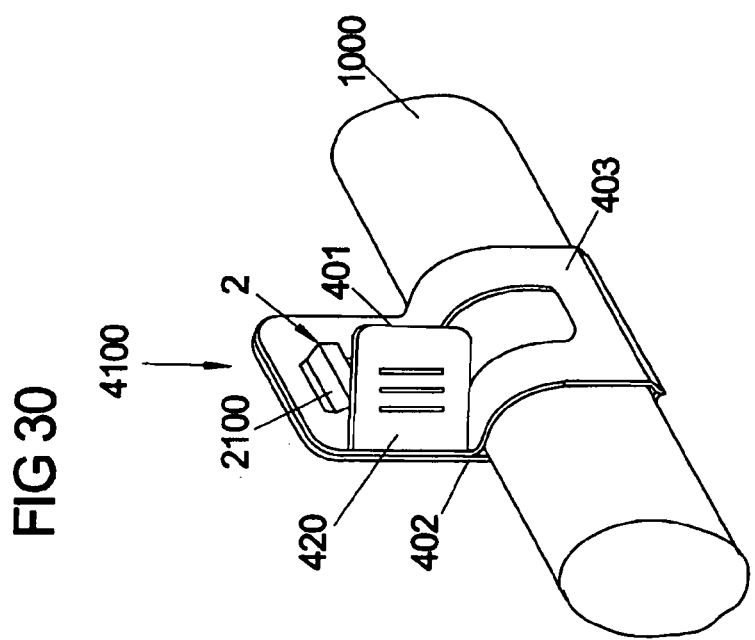

AIRBAG ARRANGEMENT AND TOOLS

CROSS-REFERENCE TO RELATED PATENT APPLICATIONS

This application is a continuation of U.S. patent application Ser. No. 11/611,676, filed Dec. 15, 2006, which is a continuation-in-part of International Application PCT/DE 2005/001508, which has an international filing date of Aug. 25, 2005. The International Application was not published in English, but was published in German as WO 2006/026956. All of the foregoing applications are incorporated by reference herein in their entireties.

BACKGROUND

The present application relates to a fixing element, to an installation tool for installing a fixing element, and to a testing tool for testing the installation of the fixing element. The application further relates to an airbag arrangement for a vehicle restraint system including a fixing element.

A fixing element is disclosed in the published specification for international patent application WO 02/28690 A1, which is incorporated by reference herein in its entirety. This fixing element is formed by a fixing clip with which an airbag, as the part which is to be fixed, can be fixed to the outside of a support wall, for example a body part of a vehicle. In specific terms, the fixing clip for fixing is latched in an opening in the support wall. For this purpose, the fixing clip is designed in such a manner that it can be inserted into the opening in the support wall and reaches through the latter, a lock occurring when a predetermined end position is reached upon insertion of the fixing clip, so that the fixing clip is prevented from being pulled out of the opening in the support wall. For the locking, the fixing clip has a snap-on element and a stop element. In the locked state of the fixing element, the stop element bears against the outside of the support wall. The "outside" of the support wall is understood here as meaning that side on which the part which is to be fixed, i.e. the airbag, is located. The snap-on element is located on the other wall side of the support wall, i.e. on the rear side of the support wall, which side faces away from the airbag, the snap-on element bearing against the rear side of the support wall in order to lock the fixing element.

Fixing elements for producing a clip connection are known from the prior art. Fixing elements of this type are generally arranged in a receiving opening and have latching elements via which they can be latched to the receiving opening. For example, fixing elements are used for fastening elements of a vehicle occupant restraint system in the vehicle interior (airbag clips). In this case, in particular, airbags or parts of an airbag module are connected to parts of the vehicle body via the fixing element.

An airbag clip for fastening airbags to part of the vehicle body is known, for example, from the document US 2005/0225061 A1, which is incorporated by reference herein in its entirety. This airbag clip has a clip-like side which can be introduced into a receiving opening of a vehicle part until it latches in the receiving opening. For the installation of an airbag, the airbag clip is guided through fastening openings of the airbag and the clip is then latched in a receiving opening of a body part or of a retaining element connected to the vehicle body. The insertion and latching of the airbag clip take place, for example, by hand.

Furthermore, the patent publication DE 32 12 160 A1 (which is incorporated by reference herein in its entirety) discloses an installation tool onto which a plurality of fixing elements can be placed and the fixing elements can then be introduced and latched successively in different receiving openings with the aid of the installation tool.

Airbags of vehicle restraint systems may be fastened to a vehicle body or a holding element connected to the vehicle body via a clip connection. For this purpose, the airbags may have, inter alia, fastening openings through which a fastening clip (fixing element) is guided, the fastening clip latching into corresponding receiving openings of the vehicle body or of the holding element and therefore fixing the airbag.

In order to permit rapid installation of an airbag, the fastening clips are frequently already inserted into the fastening openings of the airbag before the airbag is installed on the vehicle body. To install the airbag, the fastening clips then just have to be pressed into the corresponding receiving openings in the vehicle body.

SUMMARY

One exemplary embodiment relates to a fixing element to fix a part to a support wall by inserting the fixing element into an opening in the support wall. The fixing element is configured such that when the fixing element is inserted into the opening and reaches a predetermined end position, the fixing element locks to the support wall such that the fixing element is prevented from being pulled out of the opening. The fixing element comprises a stop element. The stop element bears against an outer side of the support wall when the fixing element is locked to the support wall. The fixing element also comprises a snap-on element. The snap-on element is positioned on an inner side of the support wall when the fixing element is locked to the support wall, the inner side facing away from the part to be fixed. The fixing element also includes an unlocking element connected to the snap-on element. The unlocking element is accessible from the outer side of the support wall. The unlocking element permits the snap-on element to be unlocked and the fixing element to be removed from the opening.

Another embodiment provides an installation tool for installing a fixing element in a receiving opening of a holding element. The installation tool comprises a guide shank to introduce the fixing element into the receiving opening. The guide shank has a structure which prevents the guide shank from being released from the fixing element if the fixing element is not secured in the receiving opening.

Yet another embodiment provides a testing tool for testing an installation of a fixing element installed with an installation tool on a holding element. The testing tool comprises a testing mechanism for checking a position of the fixing element with regard to the holding element. The installation tool includes a guide shank to introduce the fixing element into the receiving opening, and the guide shank has a structure which prevents the guide shank from being released from the fixing element if the fixing element is not secured in the receiving opening.

Another exemplary embodiment relates to an airbag arrangement for a vehicle restraint system. The airbag arrangement includes at least one inflatable airbag and at least one fixing element for fastening the airbag to a vehicle body. The fixing element reaches through a fastening opening of the airbag. The airbag arrangement further comprises an anti-twist protection which is distinct from the airbag and which prevents the fixing element from twisting in the fastening opening before the airbag is fastened to the vehicle body.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 illustrates a front perspective view of a fixing element according to an embodiment.

FIG. 2 illustrates a rear perspective view of the fixing element of FIG. 1 after it is fixed to a support wall.

FIG. 7 is an additional view of the fixing element of FIG. 1 when used for fixing a part to a support wall.

FIG. 8 is an additional view of the fixing element of FIG. 1 when used for fixing a part to a support wall.

FIG. 15a shows a perspective view of the installation tool during the installation of a fixing element.

FIG. 15b shows the installation tool after securing of the fixing element.

FIGS. 18a and 18b illustrate perspective views of further modifications of the testing tool.

FIG. 19b shows the components of the airbag arrangement of FIG. 19a.

FIGS. 20a and 20b show an airbag arrangement analogous to the airbag arrangement of FIGS. 19a and 19b with anti-twist protection which additionally has a tab which can be folded over onto the head of the fastening clip.

FIG. 21b shows the components of the airbag arrangement of FIG. 21a;

FIGS. 22a and 22b show a second variant of the airbag arrangement with anti-twist protection which additionally has a tab which can be folded over onto the fastening clip.

FIGS. 28a and 28b show views of a holder for holding a folded airbag.

FIGS. 30 illustrates another variant of a holder for holding a folded airbag.

FIG. 31 illustrates another variant of a holder for holding a folded airbag.

FIG. 32 illustrates another variant of a holder for holding a folded airbag.

DETAILED DESCRIPTION

Figure 3:
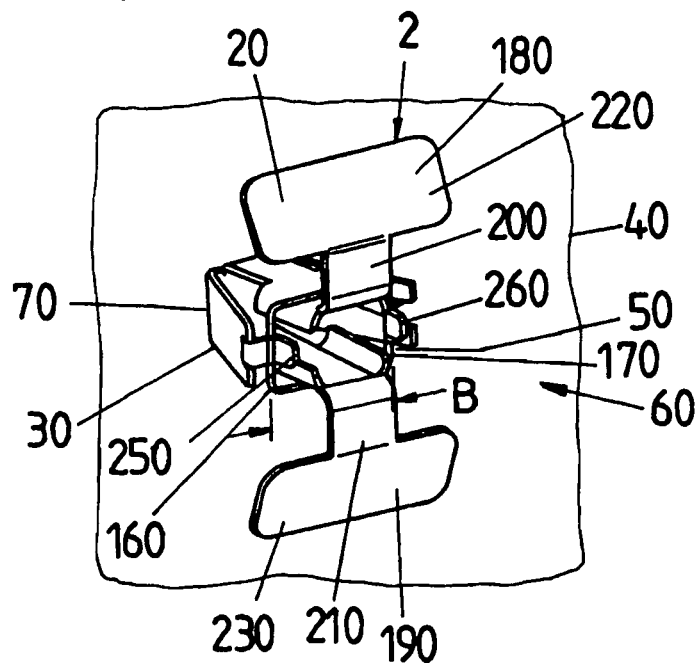
FIG. 3 illustrates the fixing element of FIG. 1 when fixed to a support wall.

It is an object to provide a fixing element which can be easily handled and installed.

According to a first aspect, an unlocking element is connected to a snap-on element of a fixing element in such a manner that it is accessible from the outside and permits the snap-on-element to be unlocked and therefore the fixing element to be pulled out of the opening.

The fixing element can readily be released again from the opening in the support wall by the unlocking element being correspondingly actuated. The fixing element permits very simple handling, since it can be used both to fix parts to a support wall in a simple manner and also to release them again in a simple manner.

By use of the unlocking element, the fixing element can be released from the support without it being damaged in the process. The fixing element according to an embodiment can therefore be repeatedly used.

According to one embodiment the fixing element can be installed by a pure "clipping operation". Screws or the like are not required for the installation of the fixing element; no threads or other measures have to be provided in the opening in the support wall either.

The unlocking element can be actuated in a particularly simple and therefore advantageous manner if it reaches through the opening in the support wall and can therefore be actuated directly from the outside.

The snap-on element has a baseplate with two parallel or at least approximately parallel side edges, with a retaining plate being attached in each case to each of these two side edges and being used to retain the fixing element on the support wall.

The side of the retaining plate containing the unlocking elements has a contact section that bears against the rear side of the support wall. The contact section forms an inward step on the snap-on element. This contact section can have a surface substantially parallel to the base plate. In the case of a snap on element with two retaining plates, the contact sections on the two retaining plates can be planar.

The distance of the retaining plates from each other can increase with increasing distance from the baseplate, the distance between the side walls being greater at their end facing away from the baseplate than the distance between the associated opening edges of the opening in the support wall. The snap-on element is therefore approximately U- or V-shaped in cross section, with the two retaining plates forming the side parts of the U or of the V.

The retaining plates can have a resilient design and can be pressed together in such a manner that, when the fixing element is introduced into the opening in the support wall, the distance between the retaining plates is reduced by the effect of the opening edges of the opening in such a manner that the distance between the retaining plates corresponds to the distance between the opening holes; the two retaining plates can therefore be pushed through the opening in the support wall.

In the case of a snap-on element with two retaining plates, there are two unlocking elements of which one interacts with the one retaining plate and the other with the other retaining plate. The two retaining plates can therefore be actuated by the two unlocking elements, thus facilitating unlocking of the fixing element.

The unlocking elements can be formed, for example, by tabs or angled parts which are attached to that end of the respective retaining plate which faces away from the baseplate and extend beyond the first contact section, or any other suitable mechanism. The unlocking elements can be connected integrally to their respectively assigned retaining plate.

The unlocking elements are arranged on the retaining plates in such a manner that actuation of the unlocking elements can take place by the unlocking elements being pressed together in relation to each other.

The baseplate of the snap-on element can be of square or rectangular design, or at least of substantially square or substantially rectangular design. In this case, the baseplate has a further pair of side edges which are in each case perpendicular to the side edges with the retaining plates originating therefrom, and which run parallel to each another. A connecting plate is arranged in each case on each of the two side edges of this further pair of side edges. These connecting plates can serve, for example, to hold stop plates of the stop element already mentioned above.

The stop element has two stop plates of which one is connected to the one connecting plate and the other is connected to the other connecting plate. The connecting plates and their associated stop plates can in each case be connected integrally to one another.

The stop elements have contact sections that bear against the outside of the support wall. The distance between the stop element surface and the base plate is greater than the distance from the snap-on element surface to the base plate. The contact sections can have surfaces substantially parallel to the base plate.

The stop plates can have an angled design, so that they bear resiliently against the outside of the support wall—i.e. on the outside of the support wall—when the fixing element is retained in place.

The angled stop plates can each have, for example, a partial plate which runs parallel to the support wall and to the baseplate of the fixing element, and a further partial plate which is angled in relation to the parallel partial plate. The partial plate, which is parallel to the baseplate, serves to connect the angled partial plate to the associated connecting plate.

The fixing element can be, according to an embodiment, a single-piece clip, preferably of metal or plastic. The fixing element can be formed, for example, by a single-piece punched and bent part of metal.

The unlocking elements are designed in such a manner that they can be released without a special tool. Furthermore, the fixing element can be designed to be secure against rotation; this means that it cannot be rotated in the opening in the support wall.

Furthermore, an embodiment includes an arrangement which has the fixing element already described above and an airbag module which is connected thereto and is fixed to or in a vehicle by the fixing element. The airbag module can be, for example, a side airbag module.

In another embodiment, an installation tool is provided with which a fixing element can be installed in a receiving opening arranged in a holding element. The installation tool comprises a guide shank for introducing the fixing element into the receiving opening. In this case, the guide shank has a structure which prevents the guide shank from being released from the fixing element if the fixing element is not secured in the receiving opening.

The installation tool can therefore only be pulled out of the fixing element to be installed if the latter is fixedly connected to the holding element. This avoids the installation tool being removed from the fixing element if the latter is not yet or is not yet completely secured in the receiving opening. It is therefore ensured that, with the installation tool, a fixing element is installed in such a manner that the latter is secured by its securing structures on the receiving opening and it is not, for example, merely other regions of the fixing element which are jammed in the receiving opening.

The receiving opening is arranged in a holding element. The holding element here may be any desired part on which a further part is to be fastened. For example, the holding element may be part of a vehicle body or another sheet-metal part.

A fixing element, for example for fastening an airbag to a vehicle part, has, as securing structures, latching hooks which can latch with the edge of a receiving opening. The latching hooks are arranged, for example, at the ends of elastic latching arms. The latching arms can be connected at one end to a closed end of the fixing element, which end is introduced into a receiving opening during the fastening of the fixing element.

When a fixing element of this type is installed, it is introduced into the receiving opening until the latching hooks latch against the edge of the receiving opening. Incorrect installation could arise, for example, by the elastic arms of the fixing element becoming jammed with the receiving opening before the latching hooks are correctly secured. The fixing element would thereby already experience a certain amount of grip, which could falsely be considered to be the correct installation position in particular if the fixing element is installed manually or if it is installed using a conventional tool.

By contrast, with the installation tool, the latter cannot be removed from the fixing element if the fixing element has simply jammed in the receiving opening. Removal, i.e. pulling of the installation tool out of the fixing element, is only possible if the fixing element is actually correctly latched at its latching hooks to the receiving opening.

The fixing element which can be fastened to the installation tool according to an embodiment can be, as mentioned, an airbag clip for fastening an airbag or other parts of an airbag module. The holding element in which an airbag clip of this type is fastened is, for example, part of a vehicle body or a part connected to the vehicle body.

Although a preferred use of the installation tool is the installation of airbag clips for installing an airbag, the installation tool is not restricted to this use and it can likewise be provided for the purpose of being able to use it to install other types of fixing elements. The only crucial factor is for the tool to be designed in such a manner that it does not become released from the clip before the latter is correctly installed.

In an advantageous manner, the guide shank of the installation tool has a cut-out or a tapered portion. In this case, the cut-out or tapered portion is designed in such a manner that, when the fixing element is introduced into the receiving opening with the aid of the installation tool, a section of the fixing element engages, before it is secured in the receiving opening, in the cut-out or tapered portion and is only released again from the cut-out or from the tapered portion when the fixing element is secured.

In particular, the tapered portion or the cut-out can be designed in such a manner that elastic arms of a fixing element, on which latching elements are arranged, are pressed together when introduced into a receiving opening, so that the free ends of the clip arms engage in the cut-out or tapered portion of the guide shank. The guide shank cannot therefore be removed from the fixing element. Only when the fixing element is introduced into the receiving opening to the extent such that the latching elements can latch in the receiving opening do the arms of the fixing element spread apart and release the guide shank of the installation tool.

In an exemplary embodiment, the installation tool has two stops which are spaced apart from each other and are designed in such a manner that the fixing element is secured if the stops strike against the holding element. Simple and rapid installation of the fixing element is therefore made possible, since the fixing element is simply introduced by the installation tool into the receiving opening until the stops strike against the holding element.

At this instance, the fixing element latches in the receiving opening. In this case, the stops have approximately identical lengths and are shorter than the length of the guide shank by the fitting depth of the fixing element. The fitting depth of the fixing element is composed here, firstly, of the thickness of the holding element and, secondly, of the distance of the closed end of the fixing element from its latching element. The fixing element is therefore latched in the receiving opening precisely at the instant at which the stops strike against the holding element.

The stops may be designed, for example, in the manner of a pin. However, it is also possible to provide other shapes which can be adapted, for instance, to a certain configuration of the holding element.

A further function of the stops is to be prevent the fixing element from being introduced too far into the receiving opening, which would possibly lead to the fixing element being twisted or pressed in too severely.

The stops can have feeling elements which generate a signal when the stops strike against the holding element. The signal is advantageously an optical, acoustic and/or electric signal. Furthermore, the signal can be supplied to an evaluating device for evaluation and storage. By this, a striking of the stops against the holding element is clearly signalled, for instance by sound or illumination of a light-emitting diode, and also can be documented. For documentation purposes, the signal generated by the feeling elements is transmitted to an evaluating device and stored, for example, together with a date or a designation of the installation fixing element.

For operation of the feeling elements and for evaluation of the electric signals generated by the feeling elements, an electronic switching circuit is advantageously arranged on the installation tool. This switching circuit can be integrated, for example, in the installation tool.

A preferred arrangement of the guide shank makes provision for the latter to be arranged centrally between two stops. In this case, the two stops may also be designed as a single piece; however, this is not absolutely necessary. It is also possible for the stops and the guide shank to be connected to one another as a single piece.

When the stops are designed as a single piece, it is also possible, for example, for an annular or hollow cylindrical stop to be provided. In this case, sections of the ring or hollow cylinder constitute the different stops. Furthermore, it should be noted that, although one embodiment provides precisely two stops, nevertheless variants of the installation tool having more than two stops and being able to be adapted, for example, to complicated shaped holding elements are also possible.

The stops and/or the guide shank may be formed from a metal. Furthermore, however, different materials may also be provided for the stops or the guide shank, for example, a plastics material.

Furthermore, the installation tool advantageously has a testing mechanism. These testing mechanisms serve to check the position of the installed fixing element with regard to the holding element. In this case, the testing mechanisms generate a signal as a function of the installation position of the fixing element. This signal may advantageously be an optical, acoustic or an electric signal.

Installation of the fixing element carried out by the installation tool can be checked with these additionally arranged testing mechanisms. In this case, for instance, a distance meter can be provided as the testing mechanism and can be used to determine the distance of a closed end, which lies opposite the holding element, of the installed fixing element from the holding element.

It can therefore be ascertained with the aid of the distance meter whether the installed fixing element actually sits in the correct installation position or, for example, is only wedged in the fastening opening but is not actually latched into place on the latching elements in the receiving opening. In such a case, the fixing element would not have been introduced into the receiving opening to a sufficient extent, and so the distance of the closed end of the fixing element would be smaller in comparison to a correctly installed fixing element. Consequently, by measuring the distance of the closed end of the fixing element from the holding element, the installation of the fixing element can be checked.

Analogously, pressing the fixing element too far into the receiving opening could also be determined by the distance meter, since in this case the distance of the closed end of the fixing element from the holding element would be larger in comparison to the correct installation position.

Additionally, a handle element is advantageously provided on the installation tool and is connected to the stops and the guide shank. With a handle element of this type, the installation tool can be handled in a simple manner during the installation of the fixing element. The handle element can be connected here, for example, to a head part of the installation tool, on which the stops and the guide shank are in turn fastened.

In another aspect, an installation tool for securing a fixing element in a receiving opening is provided, the installation tool likewise having a guide shank for introducing the fixing element into the receiving opening. In addition, there are at least two stops which are spaced apart from each other and are designed and provided in such a manner that the fixing element is secured in the receiving opening as soon as the stops strike against the holding element.

In this variant, the guide shank does not necessarily have a structure which prevents the installation tool from being pulled prematurely out of the fixing element before the latter is secured. The crucial factor in this variant of the installation tool is that there are at least two stops. The installation tool is brought up to the holding element as far as the stops. At the instant at which the stops strike against the holding element, the fixing element is secured in the receiving opening.

In yet another aspect, a testing tool is provided with which the installation of a fixing element fastened to the previously described installation tool can be checked. In this case, the testing tool has a testing mechanism which serves to check the position of the fixing element with regard to the holding element in which the fixing element is installed.

With the testing tool, a device is provided which permits retrospective checking of already installed fixing elements. The clip fastening of components, for example of an airbag or parts of an airbag module, can therefore be checked in a simple manner. The position of the fixing element is checked here with regard to the holding element, that is, for example the orientation or the distance of the fixing element or of a component of the fixing element in relation to the holding element is determined. The result of this determination can then be compared, for example, with the results which arise if the fixing element is installed correctly.

In principle, the checking by the testing mechanism can take place such that it is merely ascertained whether installation is correct or not. However, it can also be provided that the testing mechanism determines and indicate the type and/or the degree of the erroneous installation.

The testing tool can have two stops which are spaced apart from each other and are brought into contact with the holding element during the testing of the installation. The testing tool can be brought by use of the stops into a reproducible reference position. Starting from this reference position, the result of the testing operation can be compared with reference results. With reference to this comparison, it can then be decided whether the tested fixing element is in the correct installation position. For example, the test result can be compared with the test result of a fixing element which is known to be correctly installed.

The testing mechanisms advantageously have a testing shank which can be introduced into the installed fixing element. Furthermore, the testing advantageously additionally have feeling elements which are arranged on the testing shank and on the stops and generate a signal when striking the testing shank or the stops.

In this case, the testing shank can be longer than the stops by the amount of fitting depth of the fixing element. As a result, the correct position of the installed fixing element can be checked by monitoring the electric signals generated by the feeling elements. The testing shank is introduced into the installed fixing element until its feeling element is activated. If the fixing element is installed correctly, at the same time as the feeling element on the testing shank is activated, the feeling elements on the stops are also activated. If, for example, only the feeling element of the testing shank is activated or, in addition, only a feeling element of one of the distance prongs, the position of the installed fixing element is incorrect.

In a further preferred refinement, the testing mechanisms alternatively or additionally comprise a distance meter with which the distance of the closed end, which lies opposite the holding element, of the installed fixing element from the holding element can be determined. In this case, the distance meter can comprise, for example, a pin mounted in a spring. The spring exerts a restoring force on the pin. To check the position of the installed fixing element, the pin is introduced into the installed fixing element, so that it butts against the closed end of the fixing element.

The testing tool is now brought further up to the holding element until a reference position is reached. This reference position can be achieved in an advantageous manner when stops arranged on the testing tool strike against the holding element. In this embodiment, the distance meter then determines the distance of the closed end of the installed fixing element from the stops. It can then be determined from this, with account being taken of the fitting depth of a correctly installed fixing element, whether the fixing element is correctly installed or, for example, has been pressed in too far or not sufficiently far enough into the receiving opening.

A further preferred variant of the testing mechanism makes provision for the latter to comprise an optical sensor with which the orientation of the closed end, which lies opposite the holding element, of the installed fixing element relative to the holding element can be determined. In particular, the optical sensor can have a light-emitting and a light-receiving element. In this case, a suitable light-emitting element is, for example, a light-emitting diode or a laser.

A light-receiving element may be, for example, a photo diode. These elements can be integrated in the testing tool or can be arranged on a surface of a head part of the testing tool. A testing tool with an optical sensor can also have stops with which the testing tool can be brought into a reference position in relation to the fixing element to be tested. In this case, the testing tool is brought up to the holding element in which the fixing element to be tested is arranged until the stops strike against the holding element.

The optical sensor is now designed, for example, in such a manner that the light emanating from the light-emitting element is reflected at the closed end of the installed fixing element. If the installed fixing element is a correctly installed fixing element, the light is directed virtually entirely to the light-receiving element. If, however, the fixing element is not correctly installed, for example is sloping or is not deep enough in the receiving opening, only some of the light or even no light is directed to the light-receiving element.

Consequently, by evaluating the signal generated by the light-receiving element, it can be decided whether the fixing element is installed in the correct position. In addition, a more extensive analysis of the light received by the light-receiving element or of the electric signal generated in response to it can be used to determine the degree of the erroneous installation or the type of erroneous installation.

In a preferred manner, the testing mechanism generates a signal as a function of the position of the installed fixing element. The signal may advantageously be an optical, acoustic or an electric signal. For example, the correct or else the incorrect installation is therefore indicated by a corresponding optical or acoustic signal. Furthermore, an electric signal can be generated which indicates, for example, whether the fixing element is correctly or incorrectly installed. The electric signal can in particular be additionally transmitted to an evaluation unit in which it can be stored and evaluated. The testing operation can be documented by storing these electric signals. The evaluation unit can be arranged externally. Alternatively, it is also possible to integrate this evaluation unit together with an electronic switching circuit, which serves to operate the testing mechanism, in the testing tool, for example as an IC.

It is pointed out that the installation and the testing tool are configured for installing and testing different kinds of fixing elements. The installation and the testing tool can be used with a fixing element described above in connection with the first aspect.

In a further aspect, an airbag arrangement is provided for a vehicle restraint system, the airbag arrangement having at least one inflatable airbag and at least one fixing element for fastening the airbag to a vehicle body. The fixing element reaches through a fastening opening of the airbag. The airbag arrangement furthermore has anti-twist protection which is distinct from the airbag and prevents the fixing element from twisting in the fastening opening before the airbag is fastened to the vehicle body.

With the anti-twist protection provided, it is avoided that fixing elements which are prefitted in the fastening openings of the airbag twist therein about their own axis before the actual installation of the airbag. This permits particularly efficient installation of the airbag on the vehicle body, since the prefitted fixing elements are all arranged in the correct installation position in the fastening openings of the airbag. If fixing elements are prefitted without anti-twist protection, twisted fixing elements, possibly before the installation, have firstly to be rotated into the correct installation position which constitutes an additional working step which is omitted by an embodiment.

It is pointed out that the airbag can be fastened indirectly or directly to a vehicle body via the fixing element. In particular, provision may be made for the airbag to be fitted on a holding element which in turn is connected to the vehicle body. In this case, the holding element has receiving openings into which latching elements of the fixing element latch.

At its one end, a fixing element usually has latching elements for latching in a receiving opening. In addition, on the side opposite the latching elements, there is a widened head which simplifies the pressing of the fixing element into a receiving opening. In addition, the widened head clamps the airbag to the vehicle body or to a holding element connected to the vehicle body and thereby fixes it in the installation position.

The anti-twist protection can be designed in different ways, for example, as a device which locks the head of the fixing element in the installation position. Furthermore, it is possible for the anti-twist protection to act on the latching elements of the fixing element and, as a result a twisting of the fixing element in the fastening opening is prevented. It is also possible that the anti-twist protection acts on a section of the fixing element that is situated between the latching elements and the clip head and, as a result, the fixing element is fixed in a certain position.

In one embodiment, the anti-twist protection has an opening. The anti-twist protection is arranged in such a manner that the opening is aligned with the fastening opening of the airbag. In this refinement, the fixing element therefore reaches both through the fastening opening arranged in the airbag and through the opening of the anti-twist protection. The opening of the anti-twist protection is designed in such a manner that the fixing element passed through it cannot be twisted in the opening, so that the clip is held in position by the anti-twist protection and is prevented from twisting in the fastening opening of the airbag.

For this purpose, the opening of the anti-twist protection is designed in a sufficiently dimensionally stable manner such that the clip does not unintentionally twist, for example, during transportation or other handling of the prefitted airbag arrangement. For this purpose, the edge of the opening may be reinforced, for example by an additional material.

For this purpose, the opening has a shape corresponding to the shape of the fixing element, for example, to the cross section of that section of the fixing element which reaches through the opening. In particular, the opening can be of rectangular design preventing twisting of fixing elements which reach through the opening of the anti-twist protection with a section which likewise has an approximately rectangular cross section. This constitutes a standard embodiment of a fixing element. The dimensions of the rectangular opening in the anti-twist protection are selected in such a manner that, although the clip can be passed through the opening, it cannot be rotated therein.

It goes without saying that the opening in the anti-twist protection does not necessarily have to be rectangular. Of importance is that the type of opening prevents a twisting of the fixing element in it. For this purpose, the opening is coordinated with the design of the fixing element and may, for example, also be of triangular or hexagonal design or designed in the form of another polygon.

The anti-twist protection is advantageously connected to the airbag, thus simplifying the preassembly of fixing element, airbag and anti-twist protection. A connection of the anti-twist protection to the airbag is possible in particular by it being sewn onto the airbag by the circumferential seam thereof. The circumferential seam of an airbag connects material layers of the airbag and runs along the circumference of the airbag blank.

Of course, it is also possible for the anti-twist protection to be sewn onto the airbag with the aid of a separate seam. In order to produce a connection of anti-twist protection and airbag by sewing, it is provided in particular that the anti-twist protection is formed from a sheet-like material. This may be, for example a textile fabric or a plastic. Further suitable materials include cardboard or paper.

The airbag of the airbag arrangement has a fastening tab in which the fastening opening for the passage of the fixing element is arranged. This corresponds to a conventional configuration of an airbag. The anti-twist protection is advantageously connected to this fastening tab of the airbag. In this case, the anti-twist protection can be sewn or adhesively bonded at least in some sections to the fastening tab.

Analogously to the airbag, the fastening tab usually has material layers. In this case, the anti-twist protection is advantageously arranged at least in some sections between two material layers of the fastening tab. The fastening tab is usually provided directly in the airbag blank.

In one embodiment, the fastening tab has a pocket which is formed by material layers of the fastening tab. At least some sections of the anti-twist protection are pushed into this pocket. In particular, in this connection, the anti-twist protection can have an opening through which the fixing element is guided and which prevents twisting of the same in the opening. In this case, the anti-twist protection is pushed into the pocket of the fastening tab until the opening of the anti-twist protection is aligned with the fastening opening of the airbag.

A reinforced fastening tab is formed by a tab being formed on the airbag, the free end of which tab is folded over. A preferred variant of arranging the anti-twist protection on the airbag is to arrange the anti-twist protection between the folded-over and the not folded-over section of this tab. A fixing of the anti-twist protection in this position can take place in turn by sewing it or adhesively bonding it to the sections of the tab.

In a particularly advantageous refinement, the anti-twist protection has a section which can be folded over onto the head of the fixing element. This constitutes a particular advantage, since, with the aid of the section which can be folded over, the fixing element can be pressed more easily into a receiving opening, for example, of a vehicle body. This is particularly important, since the pressing of the fixing elements into the receiving openings frequently takes place by hand. By folding over a section of the anti-twist protection on to the head of the fixing element, the pressing in of the fixing element by hand is facilitated and protects the installation person from injury. In particular, in the case of fixing elements formed from metal, the fixing element has sharp edges which may result in injury when pressing the clip in by hand, this being avoided by folding over the section of the anti-twist protection on to the head of the clip before installation.

In particular, it can be provided that if the anti-twist protection is arranged between material layers of the fastening tab, a section of the anti-twist protection protrudes out of the fastening tab, with it being possible for this section to then be folded over onto the head of the fixing element.

Another embodiment comprises anti-twist protection which is additionally designed as a holder for holding the folded airbag. By use of the design as a holder, the folded airbag ("package") can be held better in position in the fitted state. The anti-twist protection in this case is formed in particular from a dimensionally stable material, for example, from a metal or a plastic. In particular, a plastic injection-moulded part is suitable.

The anti-twist protection designed as a holder can have two parts which are connected rotatably to each other at one end in each case and the free ends of which are folded onto each other and connected in such a manner that the folded airbag is embraced by the two parts. The two parts of the anti-twist protection therefore form a holder for the folded airbag. The function of preventing twisting of the fixing element is provided, for example, by structures additionally arranged on these two parts. In particular, on one part an opening can be provided through which the fixing element is guided and which is designed in such a manner that the fixing element cannot twist in it.

In an advantageous manner the free ends of the two parts are connected to each other via a clip connection. For this purpose, the two parts have, for example, mutually corresponding connecting structures.

The anti-twist protection is formed from a plastic or a metal. As already mentioned, in this case, anti-twist protection which is to additionally serve as a holder for a folded airbag is formed from a dimensionally stable material. By contrast, anti-twist protection which is to be connected fixedly to the airbag can be formed from a sheet-like material, for example from a textile fabric. This in particular also permits the anti-twist protection to be sewn onto the airbag.

In a further embodiment, a holder is provided for holding a folded airbag. The holder has an opening for the passage of a fixing element via which the holder and an airbag held in the holder can be fastened to a vehicle body. In this case, the opening is designed in such a manner that twisting of a fixing element guided through the fastening opening is prevented. With this holder, preassembly of an airbag package is possible which can then be fitted on the vehicle body in a particularly efficient manner, since prefitted fixing elements cannot twist in the opening of the holder.

For the preassembly, a fixing element is guided both through the opening in the holder that serves as the anti-twist protection and also through a fastening opening arranged in the airbag. An airbag package prefitted in the holder is produced by simple pressing of the fixing elements into correspondingly provided receiving openings in the vehicle body or in a part connected to the vehicle body.

The holder is formed in a dimensionally stable manner from a plastic or a metal. Furthermore, a tab is advantageously provided which can be folded over onto the head of a fixing element guided through the opening. This provides protection for the fingers of the installation person from injuries when pressing in the fixing element. The tab can be connected to the holder, for example, via a hinge. In the case of plastic parts, in particular made from a plastic injection moulding, the tab may also be formed integrally with the holder.

It is pointed out that the fixing element of the airbag arrangement can be of any suited kind. The fixing element is a fixing element as described above in connection with the first aspect.

FIGS. 1 and 2 illustrate a fixing element in the form of a fixing clip 2. The fixing element 2 has a stop element 20 and a snap-on element 30. The stop element 20 and the snap-on element 30 serve to fix the fixing element 2 to a support wall 40 which is illustrated schematically in FIG. 3.

It can be seen in FIG. 3 that the fixing element 2, for the purpose of being fixed to the support wall 40, is inserted through an opening 50 in the support wall 40. In the process, the snap-on element 30 reaches through the opening 50 in the support wall and locks the fixing element 2 to the support wall 40 as soon as it has been inserted to a sufficient depth.

In the locked state, the stop element 20 bears against the "outside" 60 of the support wall 40 at the surface 27 of the second contact section 23; the "outside" is understood below as meaning that side of the support wall 40 to which a part which is to be fixed, for example an airbag or an airbag module, is attached by the fixing element 2. On the other side 70 of the support wall—called rear side 70 for short below—the snap-on element 30 bears against the support wall 40 at the surface 37 of the first contact section 33 in such a manner that it is not possible to pull the fixing element 2 out of the opening 50 or from the support wall 40.

Figure 4:
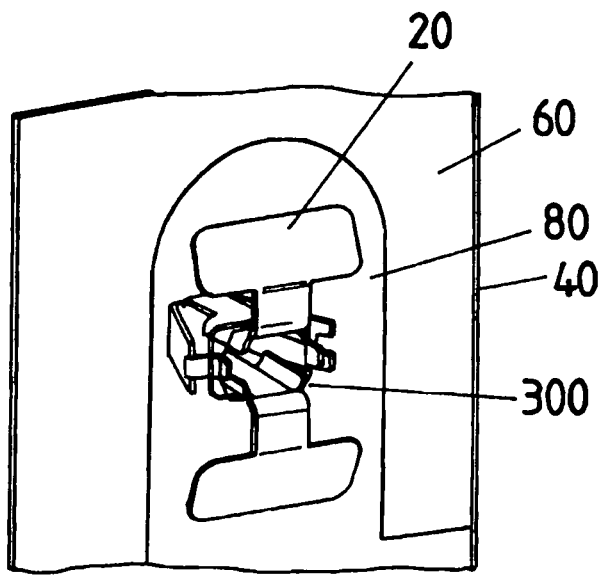
FIG. 4 illustrates the fixing element of FIG. 1 when used for fixing a part to a support wall.

The fixing of a part to be fixed to the support wall 40 by the fixing element described is illustrated schematically in FIG. 4. The part to be fixed is identified by the reference number 80 and rests on the front side 60 of the support wall 40 and is clamped to the support wall 40 by the stop element 20.

As can be seen in FIGS. 1 to 4, the snap-on element 30 has a baseplate 90 which is of substantially rectangular design. Two retaining plates 120 and 130 are molded integrally onto two parallel side edges 100 and 110 of the baseplate 90. The two retaining plates 120 and 130 are at a distance from each other which increases with increasing distance of the retaining plates 120 and 130 from the baseplate 90. As viewed in cross section, the baseplate 90 in the two locking plates 120 and 130 are therefore approximately V-shaped. The upper distance A between the two retaining plates 120 and 130 is dimensioned in such a manner that it is greater than the width B of the opening 50 in the support wall 40. Thus, A>B.

The cross-sectional surface of the baseplate 90 is selected in such a manner that it is smaller than or at maximum the same size as the opening 50 in the support wall 40. It is therefore possible first of all to readily insert the fixing element 2 together with the baseplate 90 into the opening 50. Upon such an insertion of the fixing element 2 into the opening 50, the two retaining plates 120 and 130 will butt against the two opening edges 160 and 170, so that the two retaining plates 120 and 130, which are held resiliently or elastically by the baseplate 90, are bent together while the fixing element 2 is introduced into the opening 50.

As soon as a predetermined end position is reached, in which the two retaining plates 120 and 130 have passed completely through the opening 50 in the support wall 40, the two retaining plates 120 and 130 will snap apart and therefore cause locking of the fixing element 2 in the opening 50. The two retaining plates 120 and 130 therefore form a snap-on element and, owing to their distance A from each other, prevent the fixing element 2 from being pulled out of the opening 50.

While the fixing of the fixing element 2 on the rear side 70 of the support wall 40 is by the snap-on element 30, the locking of the fixing element 2 on the front side 60 of the support wall 40 is brought about by the stop element 20. For this purpose, the stop element 20 has two stop plates 180 and 190 which, for the locking of the fixing element 2, rest resiliently on the support wall 40 at the surface 27 of the second contact section 23.

In this embodiment, in order to bring about this resilient resting on the support wall 40, the two stop plates 180 and 190 are in each case of angled design. The two stop plates each have a parallel partial plate 200 and 210 running essentially parallel to the baseplate 90 of the fixing element 2 and parallel to the support wall 40. Respective angled partial plates 220 and 230 are molded onto the two parallel partial plates 200 and 210, to be precise, at a predetermined angle. This angle is selected in such a manner that the two angled partial plates 220 and 230 are oriented in the direction of the support wall 40 and of the baseplate 90, respectively. If the fixing element 2 is now inserted into the opening 50, then the two angled partial plates 220 and 230 are pushed against the front side 60 of the support wall 40 and deflected resiliently until the two retaining plates 120 and 130 are guided completely through the opening 50, snap apart and therefore lock the fixing element 2. The two angled partial plates 220 and 230 therefore bring about a fixed bearing of the fixing element 2 against the support wall 40, thus preventing the fixing element 2 on the support wall 40 from rattling.

It can readily be seen in particular in FIGS. 1 and 2 that the two angled partial plates 220 and 230 are respectively connected to a connecting plate 240 and 241 by the two parallel partial plates 200 and 210. In addition, the two connecting plates 240 and 241 are in each case connected to the baseplate 90, to be precise, to parallel side edges 242 and 243 of the baseplate 90.

As can also be seen in FIGS. 1 to 3, a respective unlocking element in the form of a tab or an unlocking bracket 250 or 260 is molded onto the two retaining plates 120 and 130. The distance from the baseplate 90 to the unlocking elements 250 and 260 is greater than the distance from the baseplate 90 to the surface 27 of the second contact section 23. The two unlocking brackets extend in each case from that end of the two retaining plates 120 and 130 which faces away from the baseplate 90 through the opening 50 on the support wall 40 to the front side 60 of the support wall and are therefore immediately accessible from the outside. By pressing the two unlocking elements 250 and 260 together—for example by hand or with a standard pair of pliers—the two retaining plates 120 and 130 can be pressed together, so that they are then at just a distance which corresponds to the distance B between the two opening edges 160 and 170 of the opening 50. It is therefore possible to pull the fixing element 2 out of the opening 50 and to remove the fixing element from the support wall.

Figure 5:
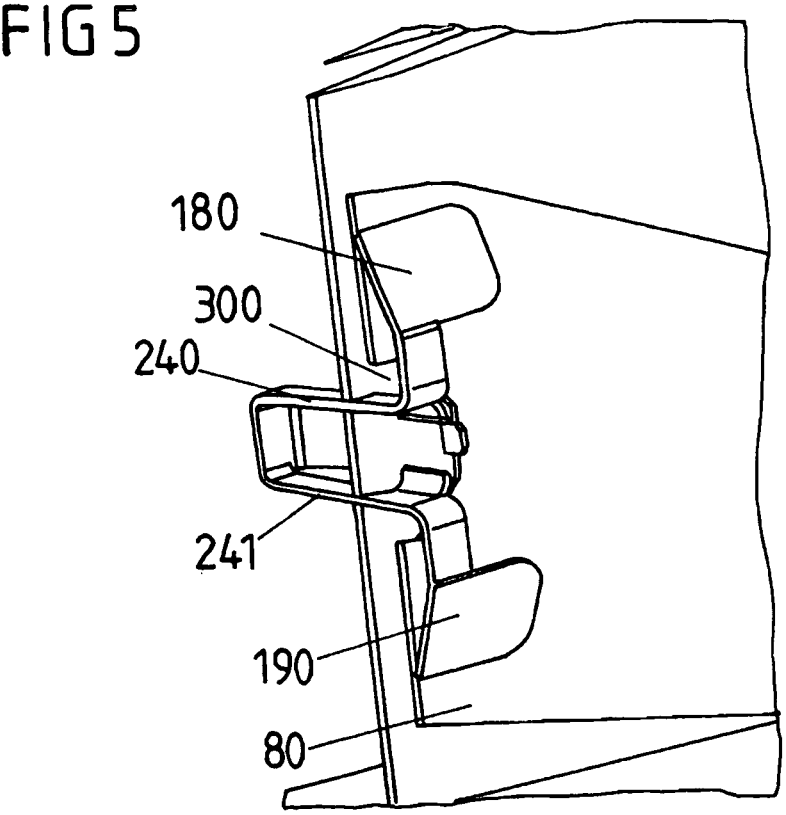
FIG. 5 is an additional view of the fixing element of FIG. 1 when used for fixing a part to a support wall.
Figure 6:
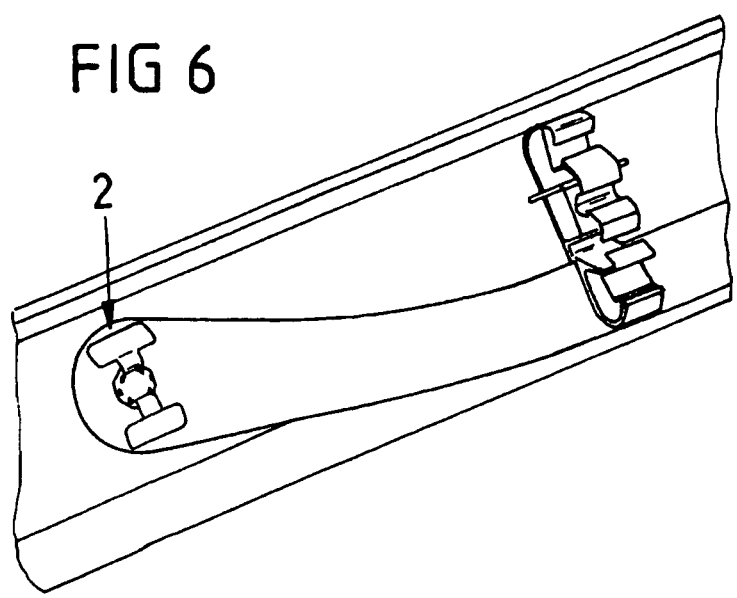
FIG. 6 is an additional view of the fixing element of FIG. 1 when used for fixing a part to a support wall.
Figure 9:
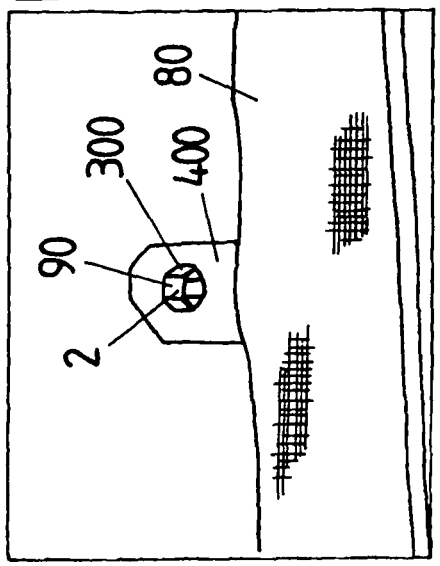
FIG. 9 shows an exemplary embodiment of an airbag module which is fixed to a vehicle body by the fixing element.

It can be seen in conjunction with FIG. 4 that, in order to fix the part 80, the latter has a hole 300 through which the fixing element 2 is completely passed by its snap-on element 30. The part 80 is therefore held by the two stop plates 180 and 190. The fixing of the part 80 to the support wall 40 by the fixing element 2 is shown once again in detail in a section in FIG. 5 and in a plan view in FIG. 6.

FIGS. 7 and 8 show the unlocking of the fixing element 2 by pressing together the two unlocking elements 250 and 260. The two arrows 310 and 320 indicate how force has to be exerted on the two unlocking elements 250 and 260 in order to arrive at them being unlocked. The fixing element 2 is shown in FIG. 8 in its unlocked position.

In conjunction with FIGS. 9 to 13, it will now be explained how an airbag of an airbag module or the entire airbag module can be fixed to a support, for example to a vehicle body, with the fixing element 2. The airbag is therefore the "part to be fixed" which is identified by the reference number 80 according to FIG. 4.

Figure 10:
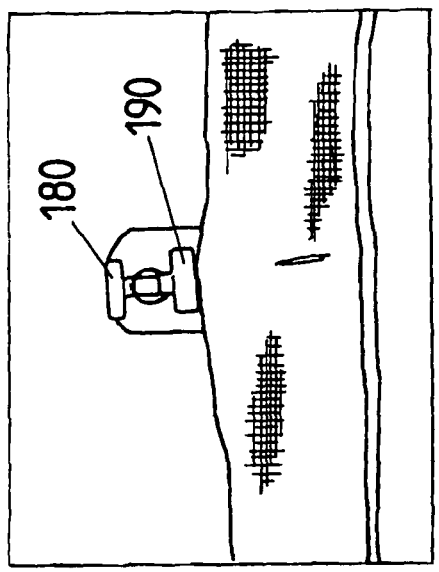
FIG. 10 is an additional view of the embodiment of FIG. 9.
Figure 11:
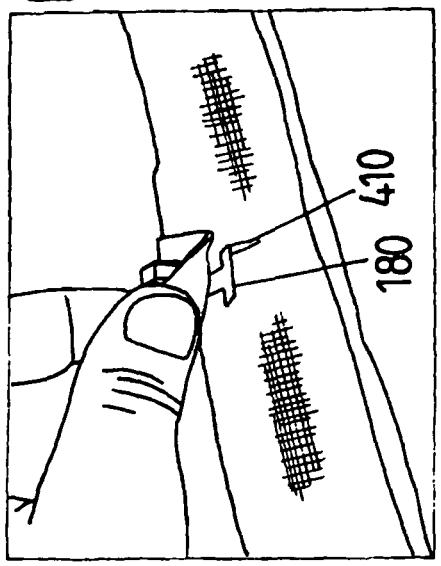
FIG. 11 is an additional view of the embodiment of FIG. 9.

For the fixing, the airbag 80 has a tab 400 with a fixing hole 300 through which the fixing element 2 is partially pushed. The size of the fixing hole 300 is selected in such a manner that only the snap-on element 30 of the fixing element 2 can be passed through whereas the stop element 20 is too large and therefore cannot pass through the opening hole 400. FIGS. 10 and 11 in particular show this in detail.

Figure 12:
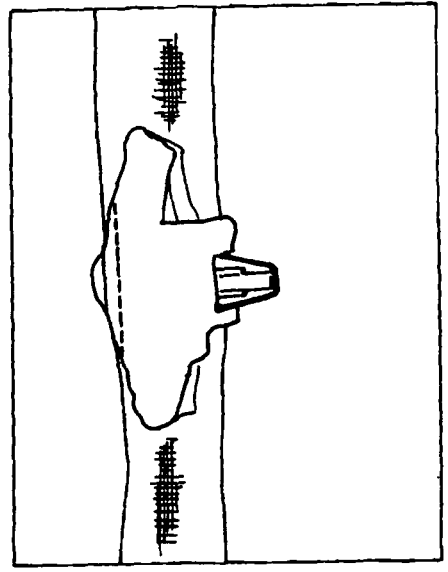
FIG. 12 is an additional view of the embodiment of FIG. 9.

Furthermore, it can be seen in FIG. 11 and 12 that the two stop plates 180 and 190 can be used for further fixing of the airbag 80 by the two stop plates 180 and 190 being inserted into an airbag covering through a slot 410.

Figure 13:
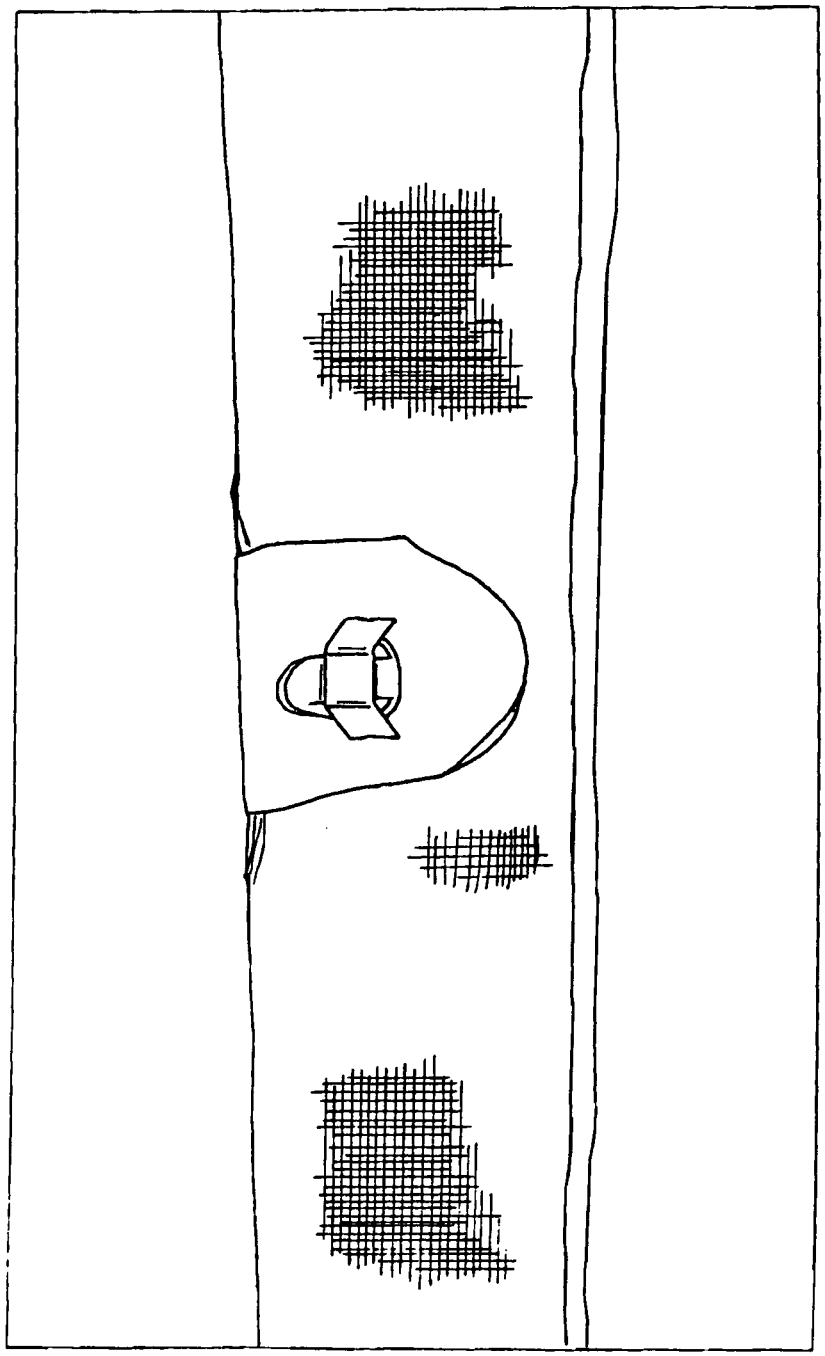
FIG. 13 is an additional view of the embodiment of FIG. 9.

FIG. 12 shows the airbag 80 after the fixing element 2 has been passed through the opening 300 and has been "hung" in the covering of the airbag module by the stop plates 180 and 190. FIG. 13 shows a different view of the resulting arrangement comprising the fixing element 2 and the airbag 80.

The resulting arrangement shown in FIGS. 12 and 13 can now be fixedly latched to the support wall 40 by the opening 50 (cf. FIGS. 3 to 8); the support wall 40 can be, for example, a motor vehicle body.

Figure 14:
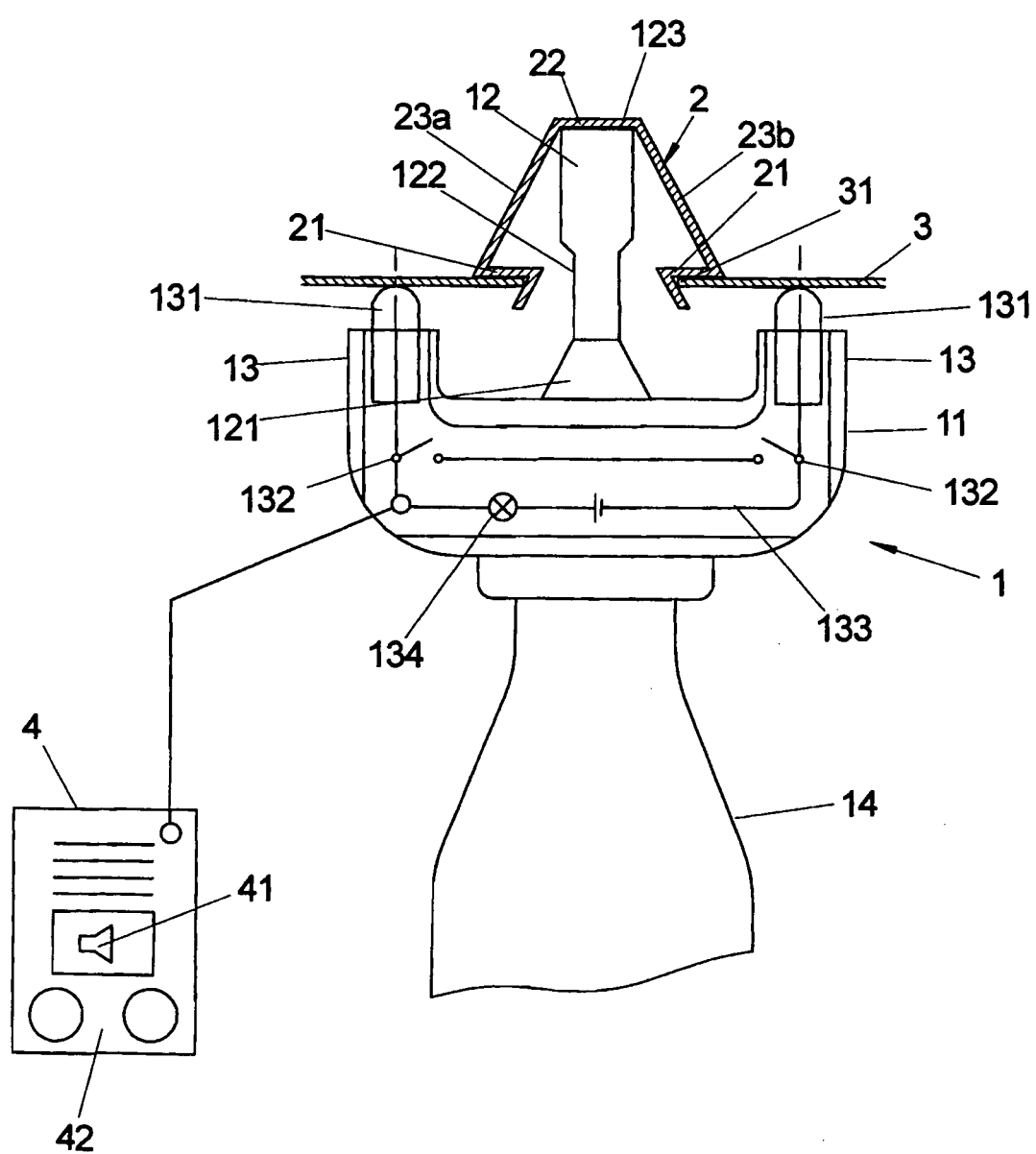
FIG. 14 illustrates a sectional illustration of an embodiment of an installation tool.

FIG. 14 shows an installation tool 1 during the installation of a fixing element in the form of a fastening clip 2 in a receiving opening 31 of a sheet-metal part 3. In the illustration of FIG. 14, the fastening clip 2 is already secured in the receiving opening 31. The fastening clip 2 has, for fastening purposes, bendable arms 23a, 23b which are connected to each other via the closed end 22. Latching hooks 21 which engage behind part of the sheet-metal part 3 and therefore latch to the receiving opening 31 are situated on the free ends of the fastening arms 23a, 23b.

The installation tool 1 has a head 11 on which a guide prong 12 is arranged centrally as the guide shank and two stop prongs 13 are arranged in the outer region as stops. The head 11 of the installation tool 1 is connected to a handle element 14 for handling the installation tool 1.

The guide prong 12 serves to introduce a fastening clip into a receiving opening. At its end connected to the head 11 of the installation tool 1, it has a section 121 which is of conical design and facilitates the introduction of the guide prong into the fastening clip. A tapered portion 122 adjoins the conical section 121. The tapered portion 122 is designed in such a manner that the latching hooks 21 of the fastening clip engage in the tapered portion 122 before the fastening clip 2 is secured in the receiving opening 21.

As a result, a connection of the fastening clip 2 to the installation tool 1 is produced preventing the guide prong from sliding out of the fastening clip 2 before the fastening clip 2 is secured in the sheet-metal part 3. The state in which the latching hooks 21 of the fastening clip 2 engage in the tapered portion 122 is not shown in FIG. 14, since the fastening clip 2 is already secured in the receiving opening 31. In this case, the arms 23a, 23b are expanded to an extent such that the latching hooks 21 no longer engage in the tapered portion 122 and the guide prong 12 of the installation tool 1 can be pulled back out of the fastening clip. The situation before the fastening clip is secured in the receiving opening is illustrated in FIG. 15a.

The outer end 123 of the guide prong 12 is of flat design, so that the fastening clip 2 can be placed conclusively by its closed end 22 onto the guide prong 12. Once placed onto the guide prong 12 to this extent, the fastening clip 2 is introduced into the receiving opening 31 until the stop prongs 13 of the installation tool 1 strike against the sheet-metal part.

In this case, the length of the stop prongs 13 is shortened in comparison to the length of the guide prong 12 by the fitting depth of the fastening clip 2. The fitting depth is composed here of the thickness of the sheet-metal part 3 and the distance of the latching hooks 21 from the closed end 22 of the fastening clip 2. The securing position of the fastening clip 2 is therefore achieved precisely whenever the stop prongs 13 are in contact with the sheet-metal part 3. If appropriate, the length of the guide prong 12 can be selected to be somewhat larger, so that, when the stop prongs strike against the sheet-metal part 3, the fastening clip 2 is always introduced to a sufficient depth into the receiving opening 31. However, the length of the guide prong must not be selected to be too large, since otherwise the fastening clip would be introduced too far into the receiving opening and would possibly be twisted.

The distance prongs 13 have feeling elements 131 which register a striking of the stop prongs 13. The feeling pins 131 are connected in the exemplary embodiment shown in FIG. 14 to switches 132 of an electronic switching circuit 133 which is integrated in the head 11 of the installation tool. During striking of the stop prongs 13, the switches 132 close the electric switching circuit 133. The closing of the switching circuit 133 causes an optical display by a lamp or light-emitting diode 134. The feeling elements can be designed here in such a manner that they are activated directly when they make contact. Alternatively, it is possible that, for activation, they first have to be pressed in by a certain length.

Furthermore, there is an external evaluation unit 4 to which an electric signal generated during the striking of the stop prongs 13 is transmitted. In this case, the evaluation unit 4 is designed in such a manner that it emits an acoustic signal (via the loudspeaker 41) as a function of the electric signal transmitted.

In addition, the evaluating device has a recording unit 42 in which the electric signal transmitted by the electric switching circuit 133 is stored. In particular, whether or by which of the two feelers 131 an electric signal has been generated is stored. In addition, the time of the generation of the electric signal or, for example, a recognition of the fastening clip together with the information transmitted by the electric switching circuit 133 can be stored in order to document the installation of the fastening clip 2.

FIGS. 15*a* and 15*b* show the operation when introducing a fastening clip 2 into a receiving opening 31 with an installation tool 1 according to a further embodiment. In a similar manner to the installation tool of FIG. 14, the installation tool 1 has a forked head 11 on which a guide prong 12 is arranged centrally and two outer stop prongs 13 are arranged. The installation tool 1 likewise has a handle element 14 for guiding the installation tool 1.

A fastening clip 2 is placed onto the outer end 123 of the guide prong 12. The fastening clip 2 again has latching hooks 21 which engage in a tapered portion 122 of the guide prong 12. This prevents the guide prong 12 from being pulled out of the fastening clip 2.

FIG. 15*a* shows the situation directly after the fastening clip 2 has been introduced by the installation tool 1 into the securing position in the receiving opening 31 of a sheet-metal part 3. As the fastening clip 2 is passed through the receiving opening 31, the side arms 23*a*, 23*b* of the fastening clip 2 are pressed together by the edges of the receiving opening 31, so that the latching hooks 21 remain in engagement with the tapered portion 122 of the guide prong 12. Only when the fastening clip 2 is introduced into the receiving opening 31 until the latching hooks 21 have passed through the opening 31 and engage behind the latter can the side arms 23*a*, 23*b* of the fastening clip 2 bend apart, as a result of which the latching hooks 21 are released from the tapered portion 122 of the guide prong 12 and are secured in the receiving opening 31.

The situation in which the latching hooks 21 of the fastening clip 2 are passed through the receiving opening 31 of the sheet-metal part 3 until they latch with the receiving opening 31 is shown in FIG. 15*b*. In this case, the edge of the receiving opening 31 engages in a curvature 211 of the latching hooks 21, thus producing a clip connection between the fastening clip 2 and the sheet-metal part 3. In this position, in which the fastening clip 2 is secured to the sheet-metal part 3, the arms 23*a*, 23*b* of the fastening clip 2 are bent apart until they no longer engage in a tapered portion 122 of the guide prong 12, with the result that the latter can be pulled back out of the fastening clip 2.

Figure 16:
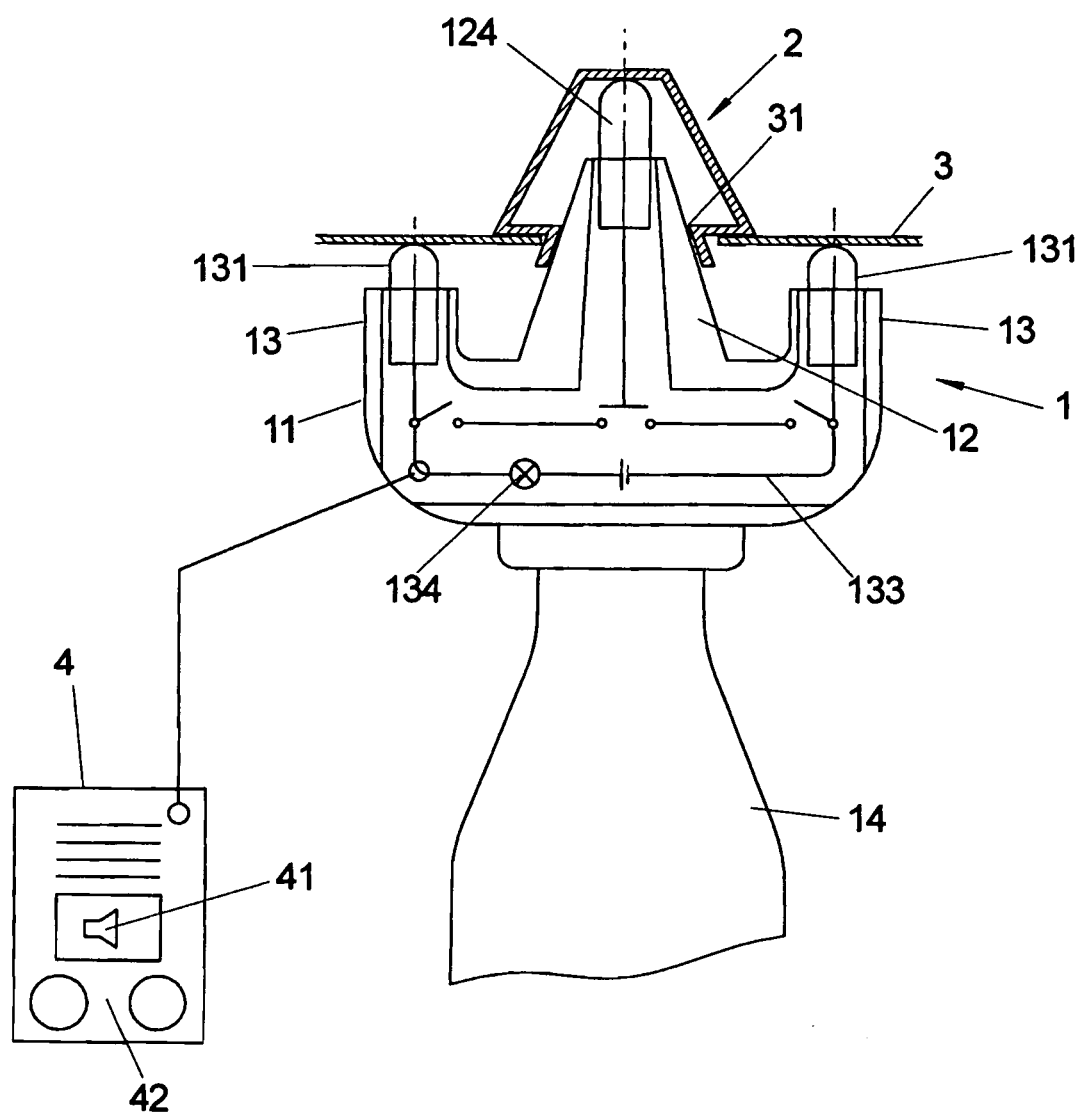
FIG. 16 is a sectional illustration of an embodiment of a testing tool.

FIG. 16 illustrates an embodiment of the testing tool for testing the installation of a fastening clip. Analogously to the embodiment of the installation tool of the preceding figures, a testing tool 10 has a head 11 on which outer stop prongs 13 are arranged which each have a feeling element 131 which registers the striking of the particular stop prong against the sheet-metal part 3. Centrally with respect to the latter, however, instead of a guide prong there is a testing shank 101 which, when testing the position of an installed fastening clip, is introduced into the latter. The testing shank 101 is of conical design, which facilitates the introduction of the testing shank into the fastening clip during the testing operation.

At its outer end, the testing shank 101 likewise has a feeling element 124 which detects when the testing shank 101 makes contact. With the feeling element 124 of the testing shank 101, a striking of the outer end of the testing shank 101 against the inside of the closed end of the installed clip 2 is registered. The fitting position of the fastening clip 2 can therefore be determined by the testing tool 1: in a similar manner to the exemplary embodiment of the installation tool according to FIG. 14, the lengths of the stop prongs 13 are shortened with respect to the length of the testing shank 101 by the fitting depth of the fastening clip 2.

The result of this is that, when the testing shank 101 is introduced into a correctly installed fastening clip 2, both the feeling element 124 of the testing shank 101 and the feeling elements 131 of the two outer stop prongs 13 are activated, since the stop prongs 13 and the testing shank 101 strike against the fastening clip 2 and against the sheet-metal part 3, respectively. If a fastening clip 2 is not correctly installed, for example in the case of a clip which is arranged in a sloping manner in the receiving opening 31 or is not introduced sufficiently far enough into the latter, not all of the feeling elements would respond at the same time.

Like the installation tool of FIG. 14, the testing tool 1 has an electronic switching circuit 133 which is integrated in the head 11 of the testing tool 1 and generates an electric signal depending on the position of the feeling elements 131, 124. The electric signal activates a lamp element 134, so that, when all of the feeling elements 131, 124 are activated simultaneously, the said electric signal is displayed optically. Furthermore, the electric signal generated by the switching circuit 131 as a function of the activation of the feeling elements 131, 124 can be transmitted to an external evaluation unit 4.

This evaluation unit 4 corresponds to the evaluation unit illustrated in FIG. 14 and likewise has a loudspeaker 41 for the acoustical conversion of the electric signal received, and a storage unit 42. The electric signal of the switching circuit 133 can be stored in the storage unit 42, for example, together with the time at which it was generated. As a result, the testing operation carried out by the testing tool 1 can be documented. Provision may be made for it to be registered whether or which of the feeling elements 131, 124 were activated during the testing operation. It is therefore stored in the evaluation unit whether the tested fastening clip 2 was correctly installed. In addition, the information transmitted from the electric switching circuit 133 to the evaluation unit 4 can be evaluated to the effect that it can be determined which of the feeling elements 131, 124 arranged were activated. As a result, if appropriate, it would only be possible to ascertain that there is an erroneous installation but also it would be possible to determine and document the type of erroneous installation.

Figure 17A:
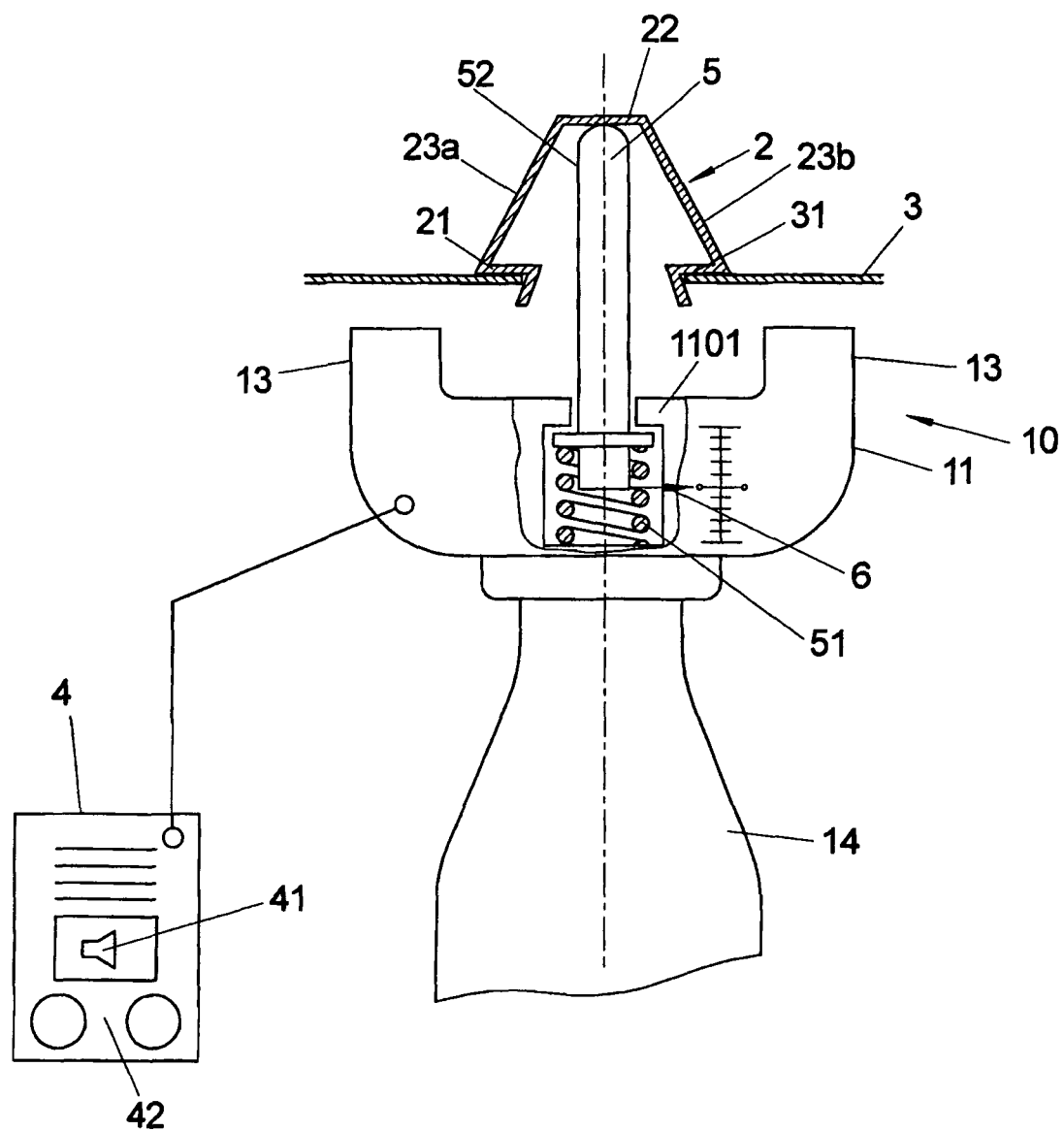
FIG. 17a is a sectional illustration of a second embodiment of the testing tool.

FIG. 17*a* shows a further embodiment of the testing tool. A testing tool 10 has a testing pin 5 which is mounted at one end in a spring 51 which exerts a restoring force on the testing pin 5. The testing pin 5 and the spring 51 are parts of a distance meter. The spring 51 is arranged in an opening 1101 of a head 11 of the testing tool 10. The testing pin 5 protrudes with one end into the opening 1101 and is connected there to the spring 51.

The testing tool 10 has stop prongs 13 which are brought into contact with the sheet-metal part 3 in order to test the installation of a fastening clip 2 mounted in a sheet-metal part 3. As a result, the testing tool 10 is brought into a defined testing position.

As the testing tool approaches the sheet-metal part 3, the testing pin 5 is introduced into the fastening clip 2 through the open side thereof. The outer end 52 of the testing pin 5 butts against the inside of the closed end 22 of the fastening clip 2. As a result, the testing pin 5 is moved in the direction of the testing tool 10 and compresses the spring 51 connected to it.

That end of the testing pin 5 which is mounted in the spring 51 is connected to a registering unit 6 which registers and displays the displacement of the testing pin 5. The distance meter is therefore used to determine a displacement of the testing pin 5 relative to the stop prongs 13. With recognition of this displacement, it is in turn possible to determine the actual fitting depth of the fastening clip 2.

For example, the testing pin 5 can be set in the zero state, i.e. before the testing operation, such that the testing pin 5 protrudes over the stop prongs 13 with a length which is larger than the desired fitting depth of a fastening clip. This would be the zero state of the testing tool 10. The registering unit 6 could be calibrated with reference to a correctly installed fastening clip; for example such that a zero is displayed when measuring a correctly installed fastening clip.

A fastening clip introduced, for example, in a sloping manner or not far enough into the receiving opening 31 of the sheet-metal part 3 would lead to the testing pin 5 being pressed further into the spring 51 during testing of the installation with the testing tool 10, which would be displayed and registered by the registering unit 6.

Furthermore, the registering unit 6 can generate an electric signal as a function of the position of the testing pin 5, which signal is transmitted to an external evaluating device 4. This evaluation unit 4 corresponds to the evaluation units already shown in FIGS. 14 and 16 and therefore will not be explained in more detail at this point.

Figure 17B:
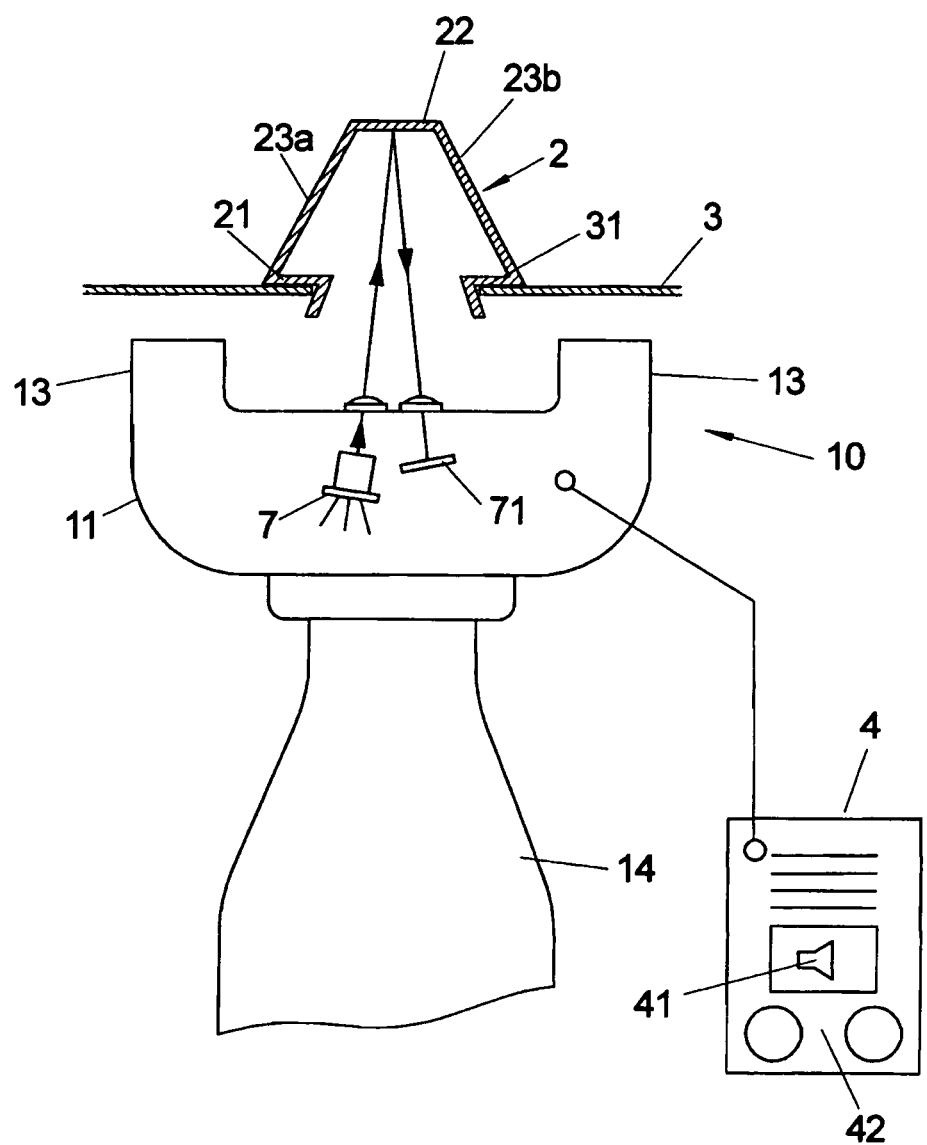
FIG. 17b is a sectional illustration of a third embodiment of the testing tool.

FIG. 17*b* shows a third variant of a testing tool. This variant is based on the optical testing of the installation of a fastening clip 2. In this case, a light-emitting diode 7 and a photo diode 71 which together form an optical sensor element are arranged on a head 11 of the testing tool 10. In addition, the head 11 of the testing tool 10 has distance prongs 13 which are brought into contact with the sheet-metal part 3, in which the fastening clip 2 is arranged, in order to test the installation position of the fastening clip 2. This constitutes the reference position of the testing tool 10 for testing the installation position of the fastening clip 2.

If a fastening clip 2 is installed correctly, the light emitted by the light-emitting diode 7 is reflected on the inside of a closed end 22 of the installed fastening clip 2. This reflection takes place in such a manner that the reflected light is received by the photo diode 71, which is arranged at a distance from the light-emitting diode 7. If the fitting position of the fastening clip 2 to be tested deviates from the desired position, the light emitted by the light-emitting diode 7 is no longer reflected exactly in the direction of the photo diode 71.

Depending on the degree of erroneous installation, only some of the reflected light reaches the photo diode 71 or it no longer reaches the photo diode 71 at all. Therefore, by evaluation of the photo diode signal, it can be determined whether the fastening clip 2 is installed correctly in the receiving opening 31 of the sheet-metal part 3. The signal of the photo diode 71 can be transmitted to an evaluation unit 4 in a manner analogous to the exemplary embodiment of FIG. 17*a*. The evaluation unit 4 corresponds to the evaluation unit already discussed in conjunction with FIGS. 14 and 16, and so it is not described more precisely at this point. Suitable evaluation of the quantity of light emitted by the photo diode also makes it possible, if appropriate, to determine the degree or type of erroneous installation FIGS. 18*a* and 18*b* show further modifications of the installation tool. In this case, the arrangement of the installation tools shown corresponds essentially to the embodiment of FIG. 14. An installation tool 1 has a head 11 on which outer distance prongs 13 and, centrally with respect to the latter, a guide prong 12 are arranged. Furthermore, a handle element 14 is provided for guiding the installation tool 1. In the embodiment of FIG. 18*a*, the handle element 14 is formed cylindrically from a metal. By contrast, the handle element 14 of FIG. 18*b* is formed from wood.

Figure 19A:
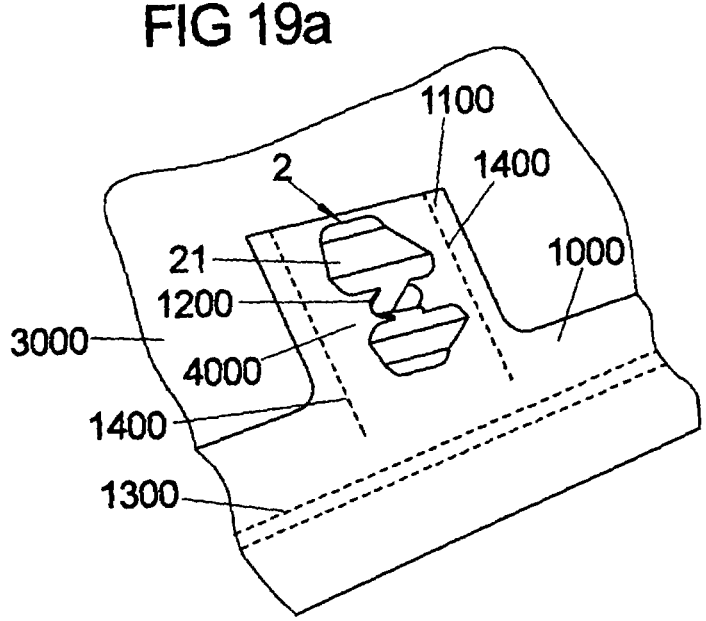
FIG. 19a shows a fastening tab of an airbag which is connected to a holding element via a fastening clip.

FIG. 19*a* shows a detail from an airbag 1000. The airbag 1000 has a fastening tab 1100 in which a fastening opening 1200 through which a fixing element in the form of a fastening clip 2 reaches is arranged. The fastening clip 2 has a head 2100 which is widened in relation to that section of the fastening clip 2 which is guided through the fastening opening 1200. In particular, the fastening clip can be the clip shown in FIG. 1. At its end facing away from the head 2100, the fastening clip 2 has latching elements (not illustrated) which latch in an opening of a holding element 3000. By latching the fastening clip 2 to a holding element 3000, the airbag 1000 is fixed to the holding element 3000. The holding element can constitute, for example a section of a vehicle body or a separate part which is connected to a vehicle body.

The airbag 1000 and therefore also the fastening tab 1100 has two layers of a textile material which are connected to each other along a circumferential seam 1300. In the region of the fastening tab 1100, anti-twist protection 4000 is arranged between the airbag layers. The said anti-twist protection is concealed in the illustration of FIG. 19*a* by the uppermost airbag layer. The anti-twist protection 4000 is connected to the fastening tab 1100 via two seams 1400.

Figure 19B:
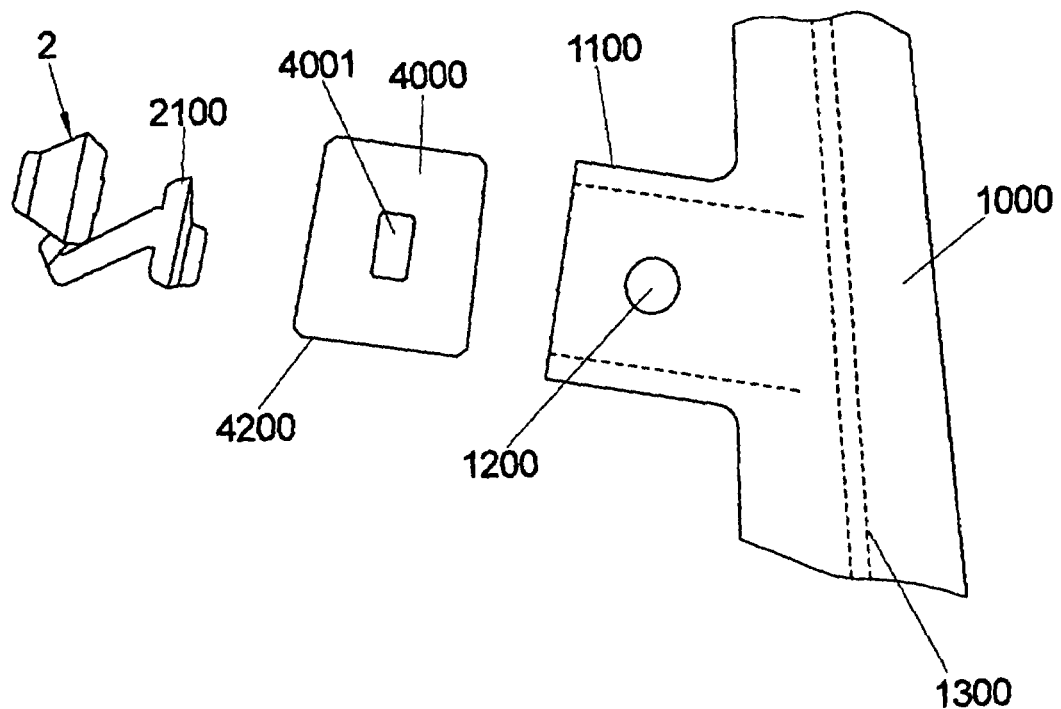

FIG. 19*b* shows the components of the airbag arrangement of FIG. 19*a*, with it also being possible to see the anti-twist protection 4000. The anti-twist protection 4000 has a rectangular opening 4001 through which the fastening clip 2 for fastening the airbag 1000 can be passed. The anti-twist protection 4000 is connected to the fastening tab 1100 in such a manner that the opening 4001 of the anti-twist protection 4000 and the fastening opening 1200 of the fastening tab 1100 are aligned with each other.

The opening 4001 of the anti-twist protection 4000 is of rectangular design with dimensions corresponding to the fastening clip 2 such that the clip 2 cannot be twisted in the opening 4001. The anti-twist protection 4000 is formed from a flat plastics material and has a thickened portion on its edge 4200 and on the edge of the opening 4001 for reinforcement purposes.

FIGS. 20a and 20b show an airbag arrangement similar to the airbag arrangement of FIGS. 19a, 19b. One difference is that the anti-twist protection 4000 additionally has a section 4300 which protrudes over the fastening tab 1100 and can be folded over towards the fastening tab 1100. This makes it possible for the additional section 4300 of the anti-twist protection 4000 to be able to be folded over onto the head of a fastening clip during the installation of the airbag 1000. A fastening clip is not illustrated in the illustration of FIG. 20a.

However, FIG. 20b shows the airbag arrangement of FIG. 20a after installation. A fastening clip 2 (illustrated by dashed lines) is passed both through the fastening opening of the fastening tab 1100 and through the opening of the anti-twist protection. To fit the airbag 1000, the fastening clip 2 is pressed into a receiving opening (not illustrated) arranged in a holding element 3000. This takes place by pressure being exerted manually onto the head 2100 of the fastening clip 2. In order to protect the installation person from injuries, the additional section 4300 of the anti-twist protection 4000 is folded over onto the head 2100 of the fastening clip 2 and pressure is exerted on the fastening clip via the section 4300. This simplifies the pressing in of the clip 2 and avoids the installation person from cutting himself on sharp edges of the head 2100 of the fastening clip 2.

Figure 21A:
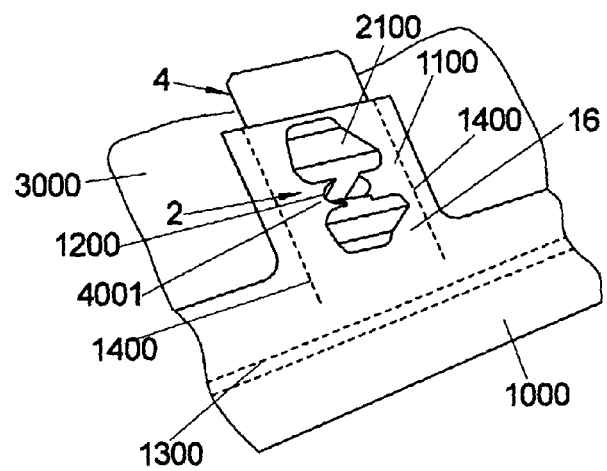
FIG. 21a shows a second variant of the airbag arrangement according to an embodiment.

FIG. 21a shows a further variant of the airbag arrangement. In this case, analogously to the variant of FIGS. 19a, 19b, an airbag 1000 is connected to a holding element 3000 via a fastening tab 1100. The connection takes place by a fastening clip 2 which is passed through a fastening opening 1200 of the fastening tab 1100. The fastening clip has already been discussed in conjunction with FIGS. 19a, 19b, and so it is not explained further at this point.

Anti-twist protection 4000 through which the fastening clip 2 reaches is again arranged on the fastening tab 1100. For this purpose, analogously to the anti-twist protection of FIGS. 19a, 19b, the anti-twist protection 4000 has a rectangular opening which is designed in a corresponding manner to the cross section of the fastening clip 2, so that the latter cannot rotate in the opening 4001 of the anti-twist protection 4000.

The difference from the embodiment of FIGS. 19a, 19b is that a pocket into which the anti-twist protection 4000 is pushed is formed in the fastening tab 1100 by seams 1400. When the fastening clip 2 is installed, the anti-twist protection 4000 is then fixed together with the airbag 1000 on the holding element 3000.

Figure 21B:
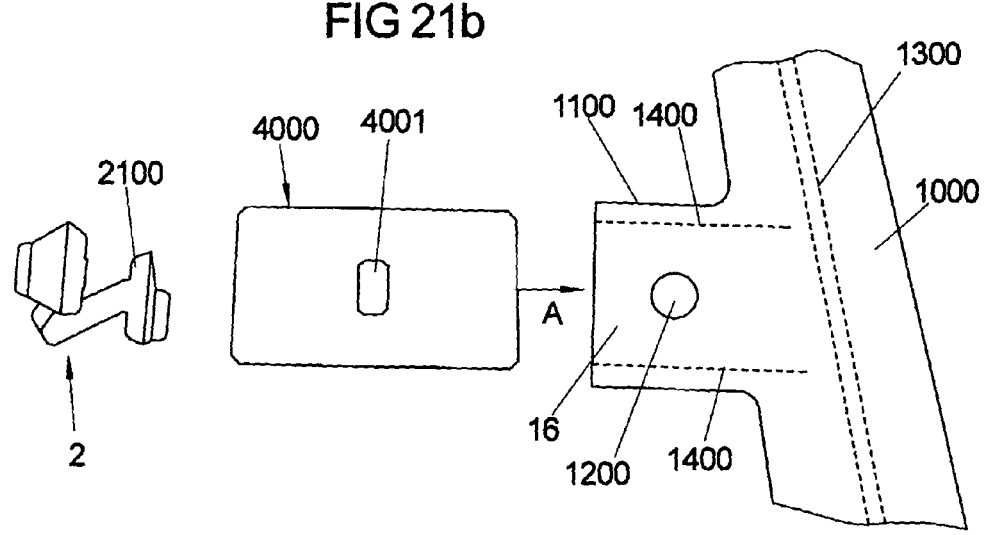

FIG. 21b shows the components of FIG. 21a before installation. The arrow A indicates how the anti-twist protection 4000 is pushed into the pocket 16 formed by the seams 1400. In this case, the opening 4001 in the anti-twist protection 4000 is arranged in such a manner that it is aligned with the fastening opening 1200 of the fastening tab 1100 when the anti-twist protection 4000 is pushed into the fastening tab 1100.

The arrangement illustrated in FIGS. 22a, 22b corresponds to the airbag arrangement of FIGS. 21a, 21b with the difference that anti-twist protection 4000 is provided which, analogously to the embodiment of FIGS. 20a, 20b additionally has a foldable section 4300.

As FIG. 22b shows the foldable section 4300 can be folded over onto the head 2100 of the fastening clip 2 (illustrated by dashed lines). This serves, as already described in conjunction with FIG. 20b, to facilitate the pressing in of the fastening clip 2 during installation and to provide protection for the fingers during manual installation of the fastening clip.

Figure 23A:
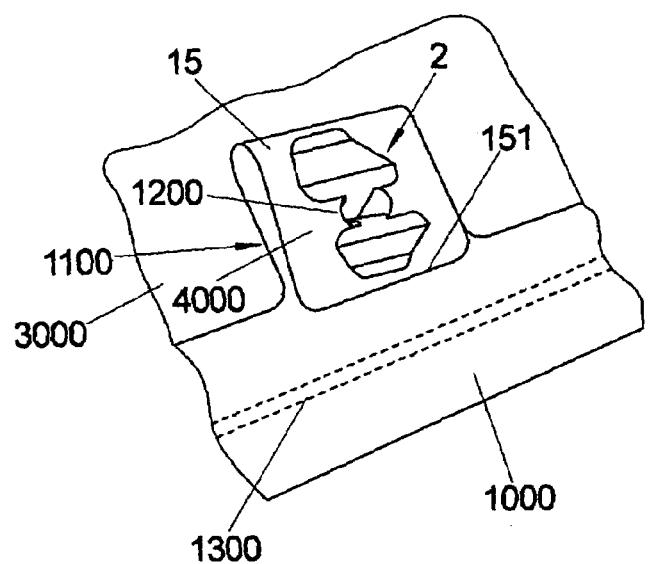
FIG. 23a shows a third variant of the airbag arrangement.

FIG. 23a constitutes a third variant of the airbag arrangement. An airbag 1000 likewise has a fastening tab 1100. However, in contrast to the embodiments of the preceding figures, the fastening tab 1100 is formed by folding over a longer tab formed on the airbag 1000. In this case, the free end 151 of the tab 15 is folded over in the direction of the airbag 1000, thus producing a reinforced fastening tab 1100. The tab 15 has two fastening openings 1200a, 1200b which, after the free end 151 is folded over, are aligned with each other and produce a fastening opening 1200 in the fastening tab 1100.

The airbag arrangement of FIG. 23a likewise has anti-twist protection 4000 which is arranged between the folded-over section 152 and the not-folded-over section 153 of the tab 15. In the illustration of FIG. 23a, the anti-twist protection 4000 is concealed by the folded-over section 152.

Figure 23B:
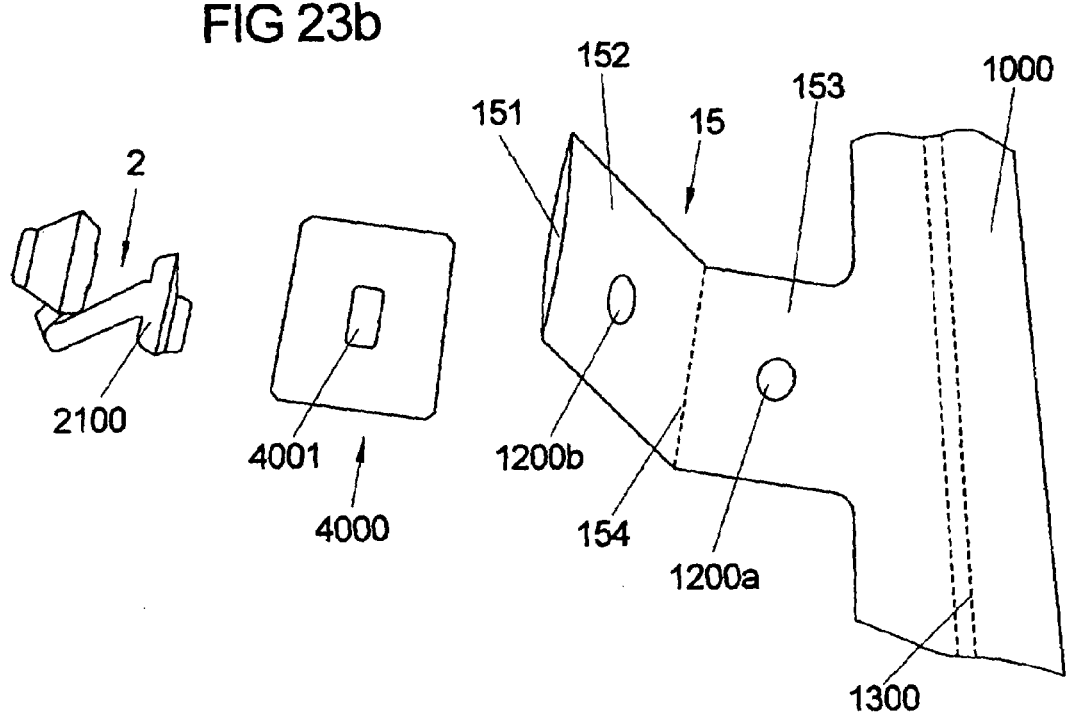
FIGS. 23b and 23c illustrate the parts of the third variant of the airbag arrangement.

The production of a fastening tab 1100 by folding over can be seen more clearly in FIG. 23b. The longer tab 15 of the airbag 1000 is shown here before being folded over. To produce the reinforced fastening tab 1100, the free end 151 of the tab 15 is folded over along a folding edge 154 on a section 153 of the tab 15.

The anti-twist protection 4000 is inserted between the two sections 152, 153 of the tab 15, so that, after the folding-over operation, it is situated between the two main layers of the fastening tab 1100. The opening 4001 in the anti-twist protection 4000 is arranged in such a manner that it is aligned with the two openings 1200a, 1200b of the tab 15 after the free end 151 of the tab 15 is folded over. The anti-twist protection 4000 inserted between the main layers 152, 153 of the tab 15 is illustrated in FIG. 23c.

Figure 23C:
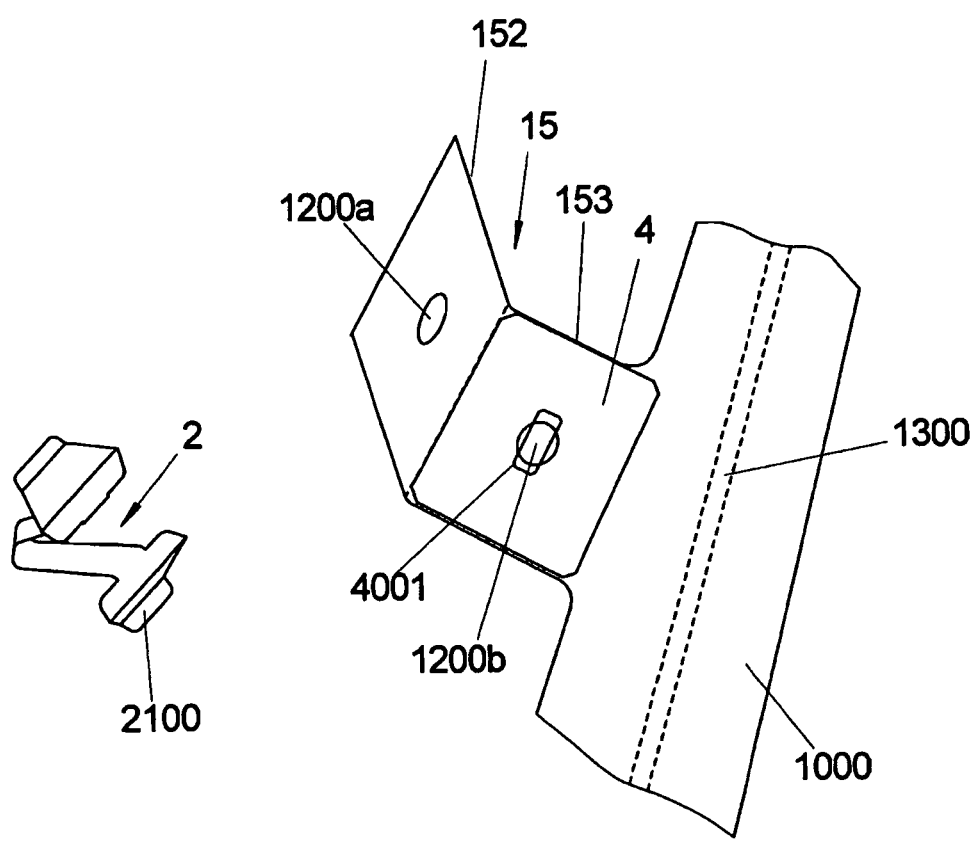
Figure 24A:
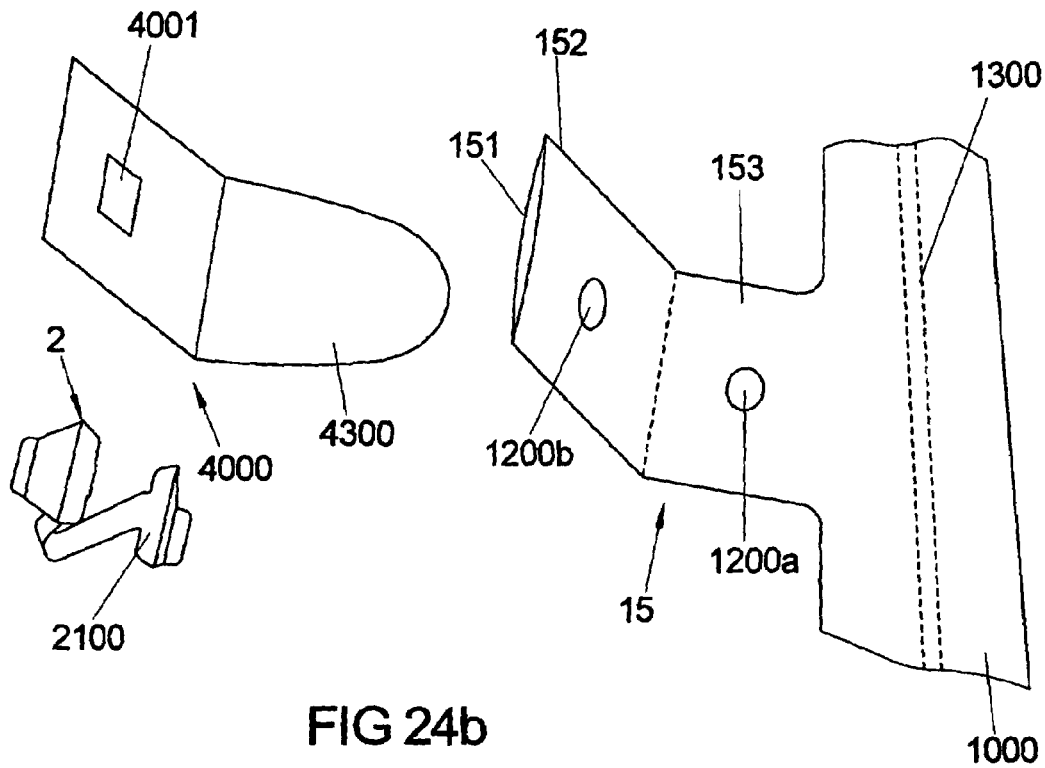
FIGS. 24a-24c show an arrangement analogous to the third variant of the airbag arrangement with anti-twist protection which has a tab which can be folded over onto the fastening clip.
Figure 24B:
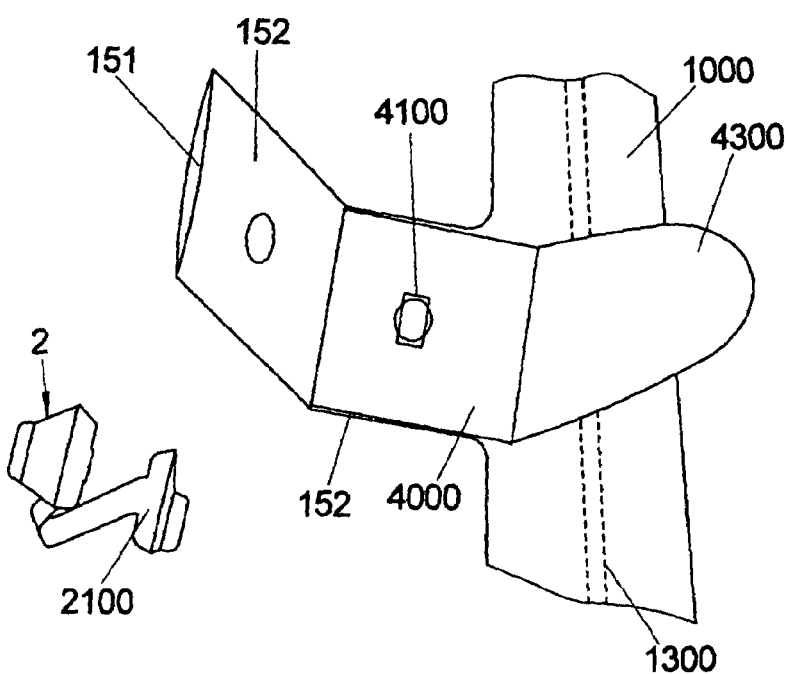
Figure 24C:
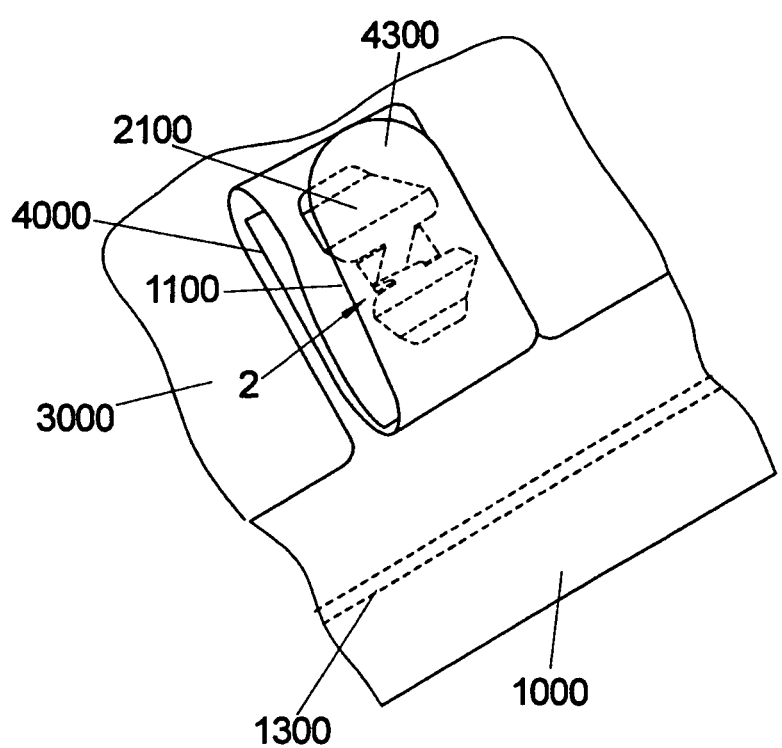

The third variant of the airbag arrangement illustrated in FIGS. 23a to 23c can have, in a manner similar to the exemplary embodiments of FIGS. 20a, 20b and 22a, 22b, anti-twist protection 4000 which forms an additional tab 4300 which can be folded over as protection for the fingers. This is shown in FIGS. 24a to 24c. FIG. 24b shows how the anti-twist protection 4000 of FIG. 24a is arranged on the tab 15. The arrangement of the anti-twist protection 4000 takes place in such a manner that, after the free end 151 of the tab 15 is folded over, the section 4300 of the anti-twist protection 4000 protrudes out of the fastening tab 1100 produced by the folding-over operation. The section 4300 can now be folded from the bottom upwards onto the head of a fastening clip 2, thus producing protection for the fingers in a similar manner to the embodiments shown in FIGS. 20a, 20b and 22a, 22b. This is shown in FIG. 24c.

Figure 25A:
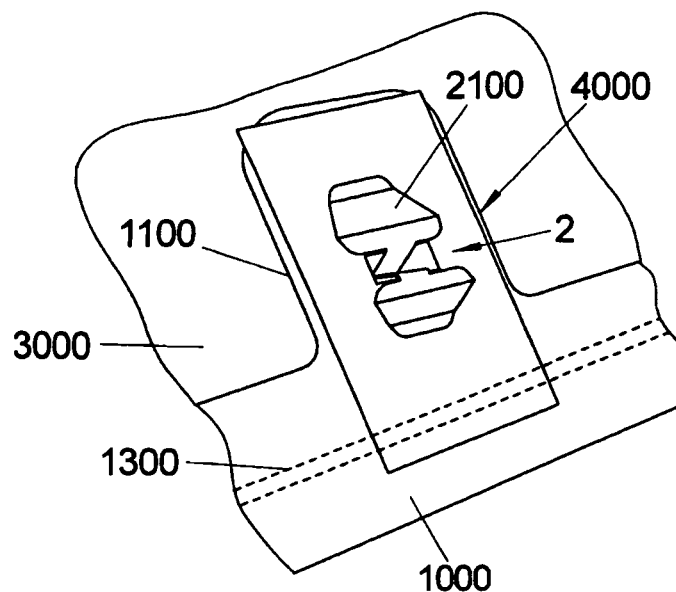
FIG. 25a shows a fourth variant of the airbag arrangement.
Figure 25B:
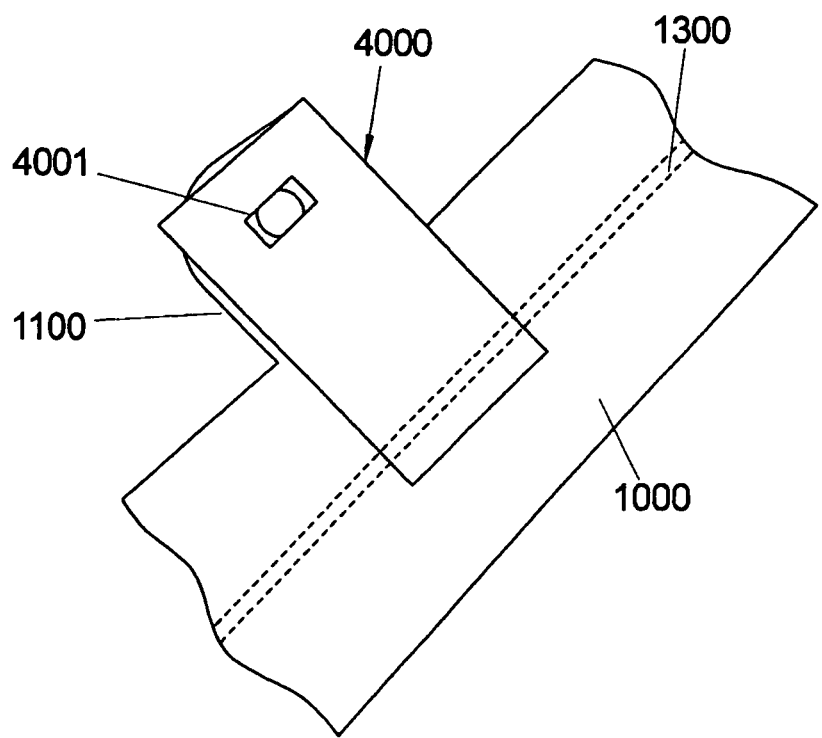
FIG. 25b is a further illustration of the fourth variant of the airbag arrangement.

A fourth variant of the airbag arrangement according to an embodiment is shown in FIGS. 25a, 25b. In this case, in contrast to the preceding embodiment, anti-twist protection 4000 is not fastened directly to a fastening tab 1100 of an airbag 1000. On the contrary, the anti-twist protection 4000 is sewn to the airbag 1000 by the circumferential seam 1300. For this purpose, the anti-twist protection 4000 extends beyond the fastening tab 1100, so that it can be connected in one working step together with the sewing of the airbag layers to the airbag 1000 by the circumferential seam 1300. A view of the anti-twist protection 4000 sewn to the airbag is shown in FIG. 25b. The fastening clip for fastening the airbag 1000 to a holding element is not shown in this illustration.

Figure 26A:
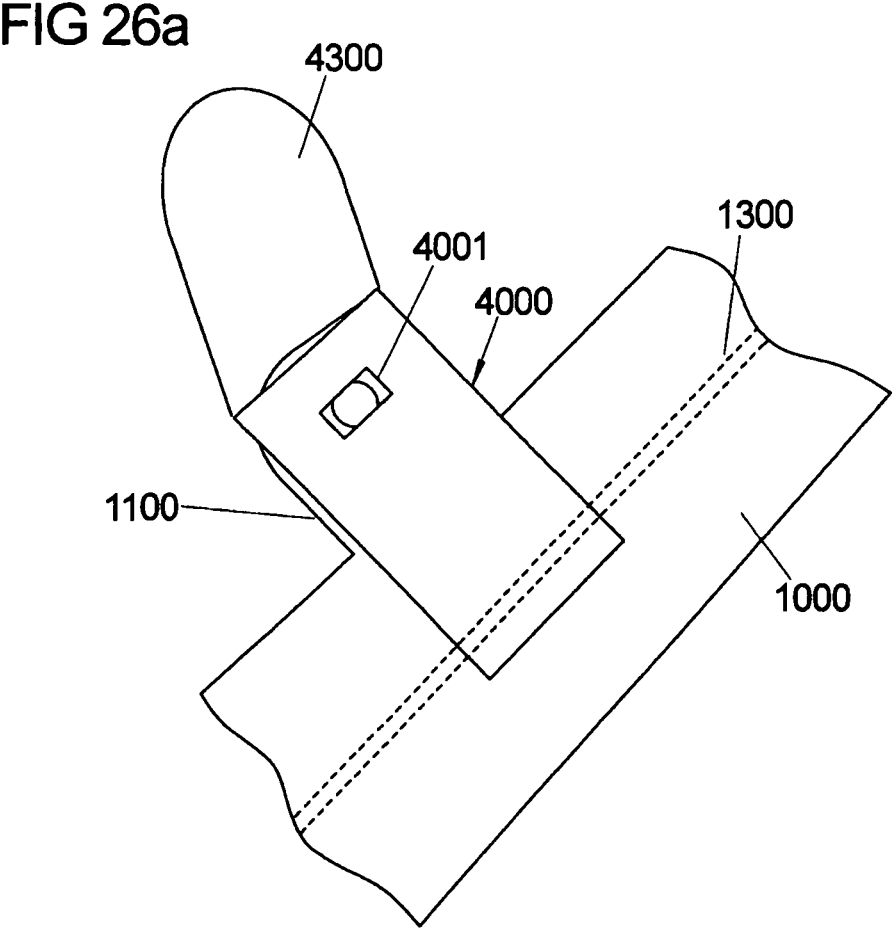
FIGS. 26a and 26b show an arrangement analogous to the fourth variant of the airbag arrangement with anti-twist protection which can be folded over in some sections on to the head of the fastening clip.
Figure 26B:
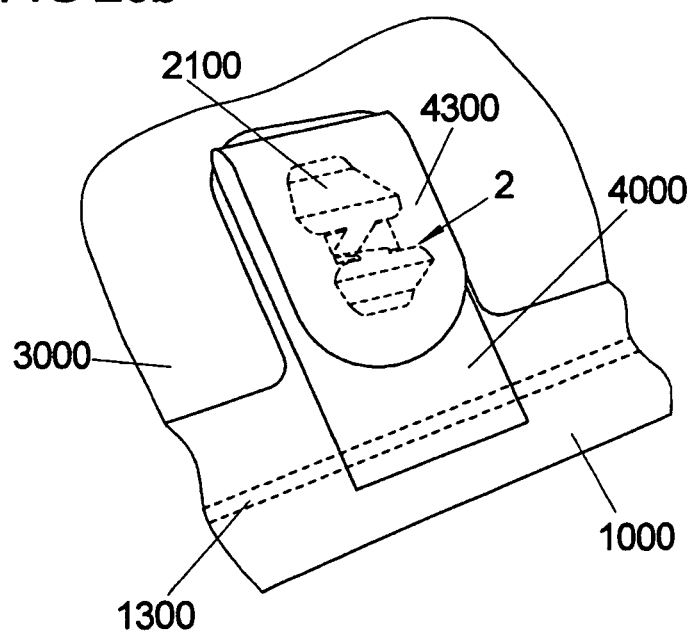

Also in the fourth embodiment of the airbag arrangement, anti-twist protection can be provided which additionally has a section which can be folded over and serves to produce protection for the fingers during installation of a fastening clip. This is illustrated in FIGS. 26a, 26b. Analogously to the embodiments of FIGS. 20a, 20b and 22a, 4b, anti-twist protection 4000 has a section 4300 which can be folded over. The section 4300 protrudes beyond the free end of the fastening tab 1100 of the airbag 1000 and can be folded over onto the head 2100 of a fastening clip guided through an opening 4001 of the anti-twist protection 4000.

Figure 27A:
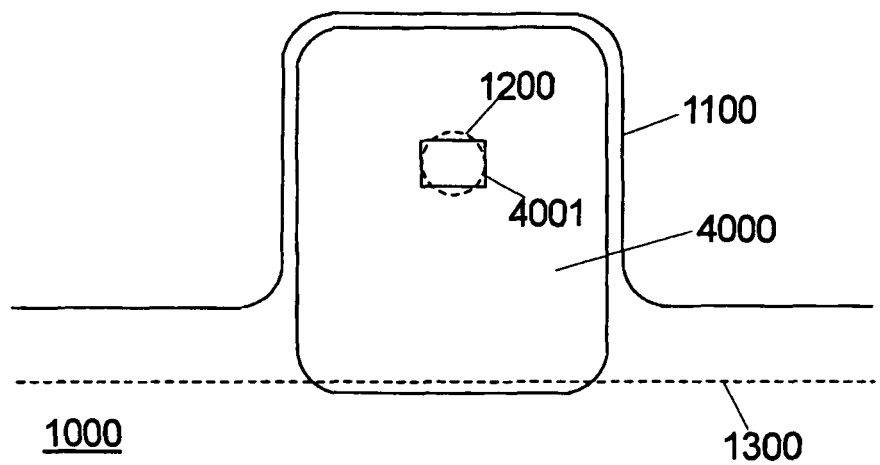
FIG. 27a shows schematically the plan view of a fastening tab and anti-twist protection which is sewn onto an airbag.

The variant in which the anti-twist protection is sewn to the airbag by a circumferential seam is shown once again in FIG. 27a as a schematic view from above. It can be seen here that the fastening opening 1200 formed in a fastening tab 1100 of the airbag 1000, is shaped in a circular manner while the opening 4001 of the anti-twist protection 4000 is of rectangular design. The effect achieved by the rectangular shape of the opening 4001 of the anti-twist protection 4000 is that a fastening clip (not illustrated) passed both through the fastening opening 1200 and through the opening 4001 cannot be twisted.

Figure 27B:
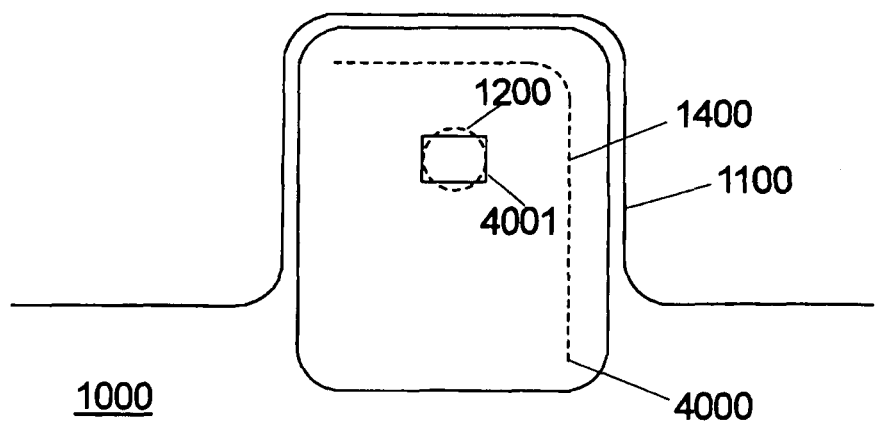
FIG. 27b shows schematically the plan view of a fastening tab onto which anti-twist protection is sewn.

A further possibility of connecting anti-twist protection 4000 to a fastening tab 1100 of an airbag 1000 is shown in FIG. 27b in a view from above. In this case, the anti-twist protection 4000 is sewn to the fastening tab 1100 by a seam 1400 running in the region of the said fastening tab 1100. In this case, the anti-twist protection 4000 is arranged with respect to the fastening tab 1100 in such a manner that the opening 4001 of the anti-twist protection 4000 is aligned with the fastening opening 1200 of the fastening tab 1100.

FIGS. 28a, 28b show a further embodiment of an anti-twist protection. The anti-twist protection is designed here as a holder 4100 which has an opening 401 through which a fastening clip 2 reaches. The holder 4100 is formed from two parts 402 and 403 which are connected to each other rotatably at one end. The respective free ends 402a, 403a of the two parts 402, 403 can be connected to each other with the aid of the fastening clip 2. A folded airbag (package) can be inserted and held between the two parts 402, 403 of the holder 4100. To insert the airbag (not illustrated), the holder 4100 is swung open and, after the airbag is inserted, the two free ends 402a and 403a are connected by the fastening clip 2. This fixes the folded airbag in the holder 4100.

With the aid of the latching elements 2500 of the fastening clip 2, the holder can be connected, for example, to the vehicle body or to a further holding element connected to the vehicle body. In this case, the latching elements 2500 of the fastening clip 2 latch in a corresponding receiving opening. A folded airbag can therefore be prefitted in the holder 4100. For the final installation, the fastening clip 2 is then merely pressed into the corresponding receiving openings, for example, in a vehicle body.

In this embodiment, the surface 37 of the first contact section 33 is substantially parallel to the baseplate 90. The surface 27 of the second contact section 23 of each of the stop elements 20 is also substantially parallel to the baseplate 90. Thus, the first contact sections 33 of the snap-on elements 30 are parallel to the second contact sections 23 of the stop elements 20.

The unlocking elements 250 and 260 include eyes 6100 and 6200. A tool such as a pair of pliers can be inserted into the eyes 6100 and 6200 in order to press the two unlocking elements 250 and 260 together, causing the two retaining plates 120 and 130 to be pressed together, so that they are then at just a distance which corresponds to the distance between the two opening edges 1600 and 1700 of the opening 401. It is therefore possible to pull the fixing element 2 out of the opening 401 and to remove the fixing element from the support walls of the holder 4100.

The opening 401 arranged in the holder 4100 is designed to correspond to the fastening clip 2 in such a manner that the latter cannot be twisted in the opening 401. The holder 4100 therefore serves at the same time as anti-twist protection, so that a prefitted fastening clip is always in the correct position before the installation and does not first have to be rotated into the correct position by the installation person. FIG. 28b shows the holder of FIG. 28a in a different perspective.

Figure 29:
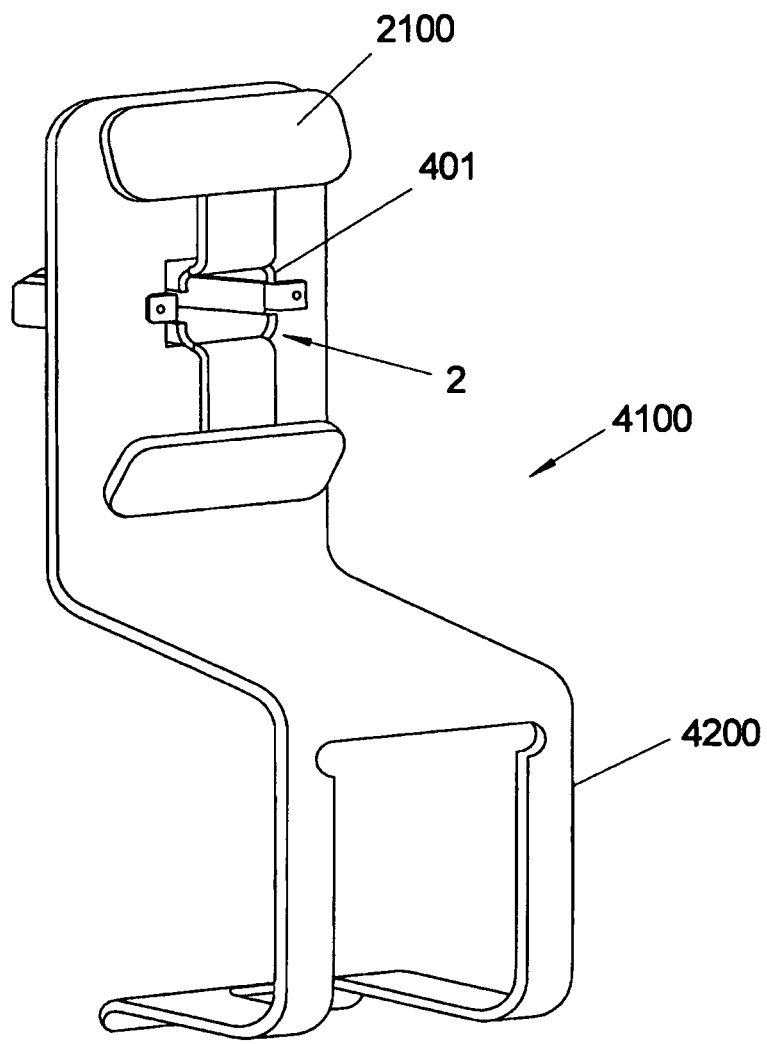
FIG. 29 shows a modification of the holder for holding a folded airbag.

FIG. 29 shows a modification of an anti-twist protection designed as a holder. A holder 4100 has a clamp-like region 4200 into which a folded airbag (not illustrated) can be inserted and held. Furthermore, the holder 4100 has a fastening opening 401 through which a fastening clip 2 can be guided. By use of the fastening clip 2, an airbag arranged in the holder can be fastened to the holder 4100. At the same time, the fastening clip 2 can be used to fasten the holder to a further part, in particular to a vehicle body, or to a part connected to a vehicle body. The opening 401 here is again designed in a corresponding manner to the cross section of the fastening clip 2 such that the latter cannot be twisted in the opening 401.

FIG. 30 shows a further modification of an anti-twist protection designed as a holder. Analogously to the embodiment of FIGS. 28a, 28b, a holder 4100 has two parts 402, 403 which are connected foldably to each other. When folded together, the two parts 402, 403 surround a folded airbag 1000 and therefore hold the latter in position. Furthermore, the holder 4100 has an opening 401 for the passage of a fastening clip 2. The opening 401 corresponds to the openings of FIGS. 28a, 28b and 29, i.e. serves analogously as anti-twist protection for the fastening clip 2 guided through the opening 401.

In addition, the holder 4100 of FIG. 30 has a tab 420 which is connected movably to the part 403. In particular, the tab 420 can be folded in such a manner that it can be folded onto the head 2100 of the fastening clip 2. The tab 420 therefore serves as protection for the fingers and can be used in order to press in the fastening clip 2 during the installation of the holder 4100 into a receiving opening, for example, of a vehicle body. The function of protection for the fingers has already been discussed in conjunction with the preceding exemplary embodiments and so is not discussed again at this point.

FIG. 31 shows a further variant for providing protection for the fingers on a holder with anti-twist protection. In this case, a holder 4100 for holding an airbag 1000 has, in a similar manner to the exemplary embodiment of FIG. 30, a tab 420 which can be folded over onto the head 2100 of a fastening clip 2. However, in contrast to FIG. 30, the tab 420 for the protection for the fingers is not formed on the edge of a part of the holder 4100. On the contrary, the tab 420 is cut out of the part 403 of the holder 4100, which simplifies the production of a corresponding holder. A holder of this type is advantageously formed from a dimensionally stable material, in particular from an injection-moulded plastic part.

FIG. 32 shows a further modification of a holder with anti-twist protection. It can be seen that a holder 4100 again has two parts 402 and 403 which, when folded together, surround and therefore hold a folded airbag in the manner of a clip. The part 402 has an opening 401 through which a fastening clip 2 is guided. A fastening tab 1100 of the airbag 1000 has a fastening opening 1200 through which the fastening clip 2 is likewise guided and therefore additionally fixes the fastening tab 1100 and hence the airbag 1000 to the holder 4100.

The head 2100 of the fastening clip 2 rests on the fastening tab 1100. The part 402 of the holder 4100 has latching structures 4021 which can latch into openings 4031 arranged and formed in a corresponding manner in the part 403. The two free ends of the parts 402, 403 can therefore be connected via a clip connection and the airbag 1000 can be fixed in the holder 4100. The airbag is additionally surrounded by a protective covering 5000 which has an opening 5100 from which the fastening tab 1100 of the airbag 1000 protrudes.

The three German priority applications: DE 20 2004 014 219.8 filed Sep. 6, 2004, DE 20 2005 019 867.6 filed Dec. 16, 2005, and DE 20 2006 000 846.2 filed Jan. 17, 2006, are all incorporated by reference herein in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A mounting element configured to fit into a through-hole in a surface in order to secure an airbag to a motor vehicle by contacting both sides of the surface, the mounting element comprising:
    an essentially rectangular base plate with four sides,
    wherein two first arms extend from a first pair of opposing sides of said base plate facing each other, both first arms have a first contact section having a first surface substantially parallel to the base plate and located a first distance from the base plate, two second arms extend from a second pair of opposing sides of said base plate facing each other, both second arms have a second contact section having a second surface substantially parallel to the base plate and located a second distance from the base plate, said second distance being larger than the first distance, whereby at least the first arms extend from the base plate to their first contact section such that their distance from one another increases,
    wherein the first arms extend beyond the first contact sections,
    wherein each one of the first arms comprises a retaining plate, the retaining plates being connected to side edges of the first pair of opposing sides of the base plate;
    wherein each one of the second arms comprises a connecting plate, the connecting plates being connected to side edges of the second pair of opposing sides of the base plate, and
    wherein the side edges of the first pair of opposing sides of the base plate are orientated perpendicular to the side edges of the second pair of opposing sides of the base plate.

2. The mounting element according to claim 1, wherein the first contact sections are planar.

3. The mounting element according to claim 1, wherein the first and second contact sections are parallel to one another.

4. The mounting element according to claim 1, wherein the first arms extend from the base plate to the first contact sections, form an inward step at this point inwardly and extend further after the step.

5. The mounting element according to claim 4, wherein the first arms further include actuation sections located a third distance from the base plate wherein the third distance is greater than the second distance of the second contact sections of the second arms from the base plate.

6. The mounting element according to claim 5, wherein the actuation sections further comprise a surface having an eye.

7. The mounting element according to claim 1, wherein the mounting element is formed from a single piece of metal.

8. A fixing element configured to fit into an opening in a support wall in order to secure an airbag to a motor vehicle by contacting both sides of the support wall, the fixing element comprising:
    an essentially rectangular baseplate with four sides,
    wherein two snap-on elements extend from a first pair of opposing sides of said baseplate facing each other, both snap-on elements have a first contact section having a first surface substantially parallel to the baseplate and located a first distance from the baseplate, two stop elements extend from a second pair of opposing sides of said baseplate facing each other, both stop elements have a second contact section having a second surface substantially parallel to the baseplate and located a second distance from the baseplate, said second distance being larger than the first distance, whereby at least the snap-on elements extend from the baseplate to their first contact section such that their distance from one another increases,
    wherein the snap-on elements include unlocking elements,
    wherein the unlocking elements further comprise a surface having an eye.

9. The fixing element according to claim 8, wherein the first contact sections are planar.

10. The fixing element according to claim 8, wherein the first and second contact sections are parallel to one another.

11. The fixing element according to claim 8, wherein the snap-on elements extend beyond the first contact sections.

12. The fixing element according to claim 11, wherein the snap-on elements extend from the baseplate to the first contact sections, form an inward step at this point inwardly and extend further after the step.

13. The fixing element according to claim 11, wherein the unlocking elements are located a third distance from the baseplate, and wherein the third distance is greater than the second distance of the second contact sections of the stop elements from the baseplate.

14. The fixing element according to claim 8, wherein the fixing element is formed from a single piece of metal.

15. A mounting element configured to fit into a through-hole in a surface in order to secure an airbag to a motor vehicle by contacting both sides of the surface, the mounting element comprising:
    an essentially rectangular base plate with four sides,
    wherein two first arms extend from a first pair of opposing sides of said base plate facing each other, both first arms have a first contact section having a first surface substantially parallel to the base plate and located a first distance from the base plate, two second arms extend from a second pair of opposing sides of said base plate facing each other, both second arms have a second contact section having a second surface substantially parallel to the base plate and located a second distance from the base plate, said second distance being larger than the first distance, whereby at least the first arms extend from the base plate to their first contact section such that their distance from one another increases,
    wherein the first arms include actuating sections comprising a surface having an eye.

16. The mounting element according to claim 15, wherein the first contact sections are planar.

17. The mounting element according to claim 15, wherein the first and second contact sections are parallel to one another.

18. The mounting element according to claim 15, wherein the first arms extend beyond the first contact sections.

19. The mounting element according to claim 15, wherein the first arms extend from the base plate to the first contact sections, form an inward step at this point inwardly and extend further after the step.

20. The mounting element according to claim 19, wherein the actuation sections are located a third distance from the base plate wherein the third distance is greater than the second distance of the second contact sections of the second arms from the base plate.

21. The mounting element according to claim 15, wherein the mounting element is formed from a single piece of metal.

22. A mounting element configured to fit into a through-hole in a surface in order to secure an airbag to a motor vehicle by contacting both sides of the surface, the mounting element comprising:

an essentially rectangular base plate with four sides, wherein two first arms extend from a first pair of opposing sides of said base plate facing each other, both first arms have a first contact section having a first surface substantially parallel to the base plate and located a first distance from the base plate, two second arms extend from a second pair of opposing sides of said base plate facing each other, both second arms have a second contact section having a second surface substantially parallel to the base plate and located a second distance from the base plate, said second distance being larger than the first distance, whereby at least the first arms extend from the base plate to their first contact section such that their distance from one another increases, wherein the first arms extend beyond the first contact sections, wherein the first arms extend from the base plate to the first contact sections, form an inward step at this point inwardly and extend further after the step, wherein the first arms further include actuation sections located a third distance from the base plate wherein the third distance is greater than the second distance of the second contact sections of the second arms from the base plate.

* * * * *